United States Patent
Schmalzried et al.

(10) Patent No.: US 11,572,169 B2
(45) Date of Patent: *Feb. 7, 2023

(54) LOADING STRUCTURE WITH TETHER GUIDE FOR UNMANNED AERIAL VEHICLE

(71) Applicant: Wing Aviation LLC, Mountain View, CA (US)

(72) Inventors: Jim Schmalzried, San Jose, CA (US); Jesse Blake, Sunnyvale, CA (US); André Prager, Sunnyvale, CA (US); Evan Twyford, Mountain View, CA (US)

(73) Assignee: WING AVIATION LLC, Mountain View, CA (US)

(*) Notice: Subject to any disclaimer, the term of this patent is extended or adjusted under 35 U.S.C. 154(b) by 167 days.

This patent is subject to a terminal disclaimer.

(21) Appl. No.: 17/100,930

(22) Filed: Nov. 22, 2020

(65) Prior Publication Data

US 2021/0269153 A1    Sep. 2, 2021

Related U.S. Application Data

(63) Continuation of application No. 16/005,288, filed on Jun. 11, 2018, now Pat. No. 10,875,648.

(51) Int. Cl.
*B64D 1/22* (2006.01)
*B64C 39/02* (2006.01)
*G06Q 10/08* (2012.01)

(52) U.S. Cl.
CPC .............. *B64D 1/22* (2013.01); *B64C 39/024* (2013.01); *B64C 2201/128* (2013.01); *G06Q 10/083* (2013.01)

(58) Field of Classification Search
CPC ... B64D 1/22; B64C 39/024; B64C 2201/128; G06Q 10/083
See application file for complete search history.

(56) References Cited

U.S. PATENT DOCUMENTS

| | | |
|---|---|---|
| 7,149,611 B2 | 12/2006 | Beck et al. |
| 8,511,606 B1 | 8/2013 | Lutke et al. |
| 8,862,288 B2 | 10/2014 | Vavrina et al. |
| 8,899,903 B1 | 12/2014 | Saad et al. |
| 9,056,676 B1 | 6/2015 | Wang |
| 9,174,733 B1 | 11/2015 | Burgess et al. |
| 9,422,139 B1 | 8/2016 | Bialkowski et al. |

(Continued)

FOREIGN PATENT DOCUMENTS

WO    2017/117609 A1    7/2017

*Primary Examiner* — Rodney A Bonnette
(74) *Attorney, Agent, or Firm* — McDonnell Boehnen Hulbert & Berghoff LLP

(57) ABSTRACT

A payload loading system is disclosed. The payload loading system includes a UAV and a loading structure. A retractable tether is coupled to a payload coupling apparatus at a distal end and the UAV at a proximate end. A payload is loaded to the UAV by coupling the payload to the payload coupling apparatus. The loading structure of the payload loading system includes a landing platform and a tether guide. The tether guide is coupled to the landing platform and directs the tether as the UAV approaches and travels across at least a portion of the landing platform such that the payload coupling apparatus arrives at a target location. The payload is loaded to the payload coupling apparatus while the payload coupling apparatus is within the target location.

18 Claims, 16 Drawing Sheets

(56) References Cited

U.S. PATENT DOCUMENTS

| | | | |
|---|---|---|---|
| 9,527,605 | B1 | 12/2016 | Gentry et al. |
| 9,573,684 | B2 | 2/2017 | Kimchi et al. |
| 9,650,136 | B1 | 5/2017 | Haskin et al. |
| 9,777,502 | B2 | 10/2017 | Curlander et al. |
| 9,914,539 | B1 | 3/2018 | Bar-Zeev et al. |
| 9,969,494 | B1 | 5/2018 | Buchmueller et al. |
| 2011/0084162 | A1 | 4/2011 | Goossen et al. |
| 2014/0032034 | A1 | 1/2014 | Raptopoulos et al. |
| 2014/0124619 | A1 | 5/2014 | McGeer et al. |
| 2015/0158587 | A1 | 6/2015 | Patrick et al. |
| 2017/0081043 | A1 | 3/2017 | Jones et al. |
| 2017/0088288 | A1 | 3/2017 | Wang |
| 2017/0197718 | A1 | 7/2017 | Buchmueller |
| 2017/0247109 | A1 | 8/2017 | Buchmueller et al. |
| 2017/0349283 | A1 | 12/2017 | Paunicka et al. |
| 2018/0118340 | A1 | 5/2018 | Russo |
| 2018/0141682 | A1 | 5/2018 | Blake et al. |
| 2018/0155030 | A1 | 6/2018 | Gil |

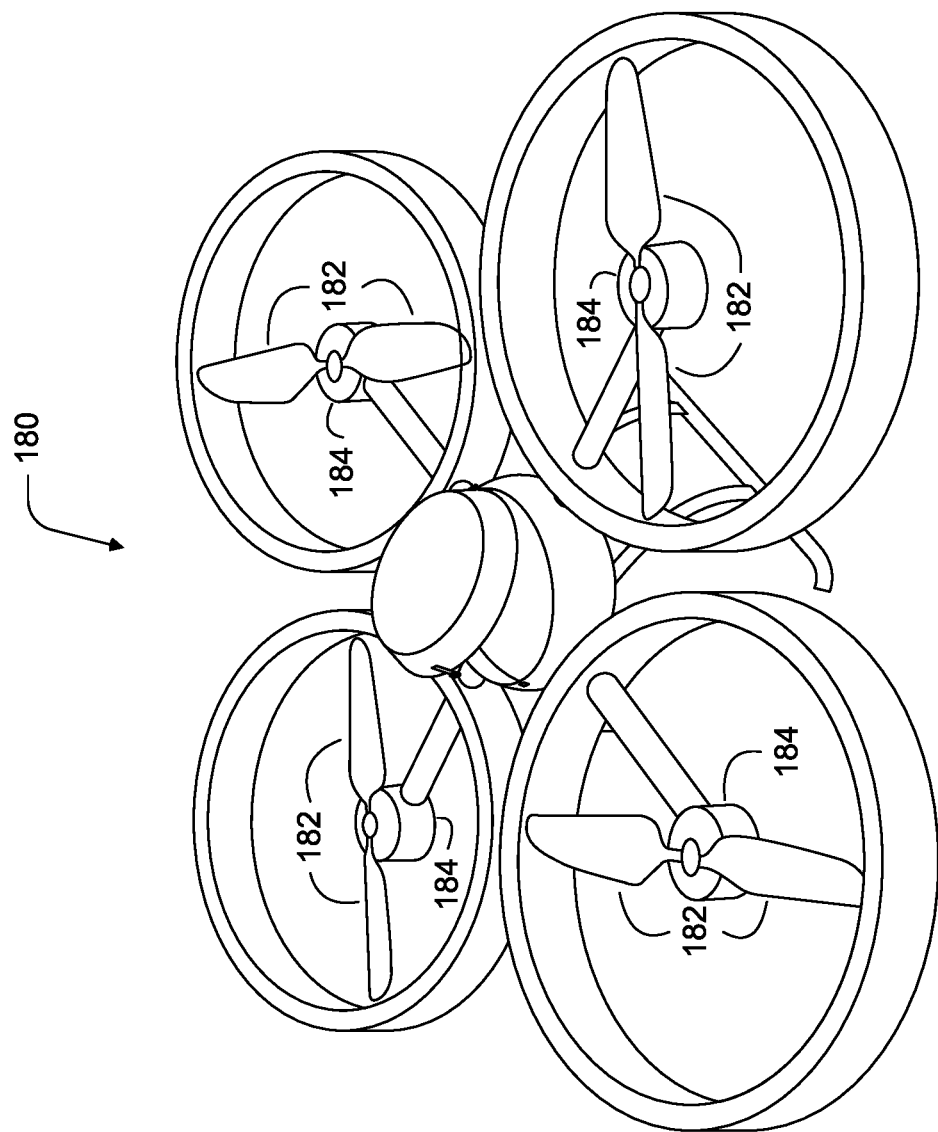

LOADING STRUCTURE WITH TETHER GUIDE FOR UNMANNED AERIAL VEHICLE

CROSS-REFERENCE TO RELATED APPLICATIONS

This application is a continuation of U.S. application Ser. No. 16/005,288, filed Jun. 11, 2018, the entire contents of which are herein incorporated by reference.

BACKGROUND

An unmanned vehicle, which may also be referred to as an autonomous vehicle, includes a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter unmanned aerial vehicles, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land.

Other examples are also possible.

Unmanned aerial vehicles (UAVs) may be used to deliver a payload to, or retrieve a payload from, an individual or business. Additional systems at the point of delivery or pick-up are helpful for users, workers, merchants and others to utilize and interact with UAVs. Loading systems and structures that facilitate safe and efficient delivery and/or pick-up of payloads are disclosed herein.

SUMMARY

The present application discloses unmanned aerial vehicle (UAV) payload loading systems, structures, and methods relating thereto. UAVs are increasingly utilized for a wide array of delivery services and as such, dedicated structures that increase the ease of use, efficiency, and safety of such delivery services is necessary. For example, a payload loading system designed to interact with an approaching or departing UAV associated with a delivery service may facilitate better access to loading a payload to, or unloading a payload from, the UAV. Moreover, additional components may be included as part of the payload loading system to further support the UAV delivery service.

Example payload loading systems described herein may be installed on freestanding support structures, may be installed on or within existing structures such as building walls, rooftops, trucks, lamp posts, cell towers, warehouses, etc., or may be installed by modifying an existing structure with aspects described herein. Beneficially, the payload loading systems described herein may be installed in a variety of locations without impeding everyday life of merchants, customers, or other people, while increasing the efficiency of access to UAV delivery service to the same merchants, customers, or other people.

In one embodiment, a payload loading system is described. The payload loading system includes a UAV and a loading structure, among other potential components. The UAV includes a retractable tether. A payload coupling apparatus is coupled to a distal end of the tether and the UAV is coupled to a proximate end of the tether. The tether may be extended or retracted by a winch system of the UAV such that the payload coupling apparatus is lowered down away from the UAV or raised up towards the UAV. A payload is loaded to, unloaded from, or both unloaded from and then another payload is loaded to the UAV by coupling the payload to the payload coupling apparatus. The loading structure of the payload loading system includes a landing platform and a tether guide. The tether guide is coupled to the landing platform and directs the tether as the UAV approaches and travels across at least a portion of the landing platform such that the payload coupling apparatus arrives at a target location. Moreover, the UAV may land on and move across or hover over the landing platform as the UAV travels across at least a portion of the landing platform. The payload is loaded to and/or unloaded from the payload coupling apparatus while the payload coupling apparatus is within the target location. The landing platform may include a channel that also guides the tether such that the payload coupling apparatus arrives at the target location. In some embodiments, the channel may be attached to or a component of the tether guide.

In another embodiment, a payload loading structure is provided. The payload loading structure includes a landing platform for a UAV and a tether guide. The UAV includes a retractable tether. The tether is coupled to a payload coupling apparatus. A payload may be attachable to the payload coupling apparatus. The tether guide is coupled to the landing platform and directs the tether such that the payload coupling apparatus arrives at a target location. The payload is loaded to and/or unloaded from the payload coupling apparatus at the target location.

In yet another embodiment, a method is described. The method includes the UAV traveling across at least a portion of a landing platform coupled to a loading structure. The method also includes guiding a tether of the UAV such that a payload coupling apparatus arrives at a target location. The tether is coupled to the UAV at a proximate end of the tether while the payload coupling apparatus is coupled to a distal end of the tether. The tether is guided by a tether guide coupled to the loading structure. The method further includes loading a payload to the UAV by coupling the payload to the payload coupling apparatus while the payload coupling apparatus is within the target location. In additional embodiments the method may include other aspects.

In further embodiments, any type of system or device could be used or configured as a means for performing functions of any of the methods described herein (or any portions of the methods described herein). For example, a system to load or unload a payload includes means to guide the tether such that the payload coupling apparatus reaches the target location.

These as well as other aspects, advantages, and alternatives will become apparent to those of ordinary skill in the art by reading the following detailed description, with reference where appropriate to the accompanying drawings. Further, it should be understood that the description provided in this summary section and elsewhere in this document is intended to illustrate the claimed subject matter by way of example and not by way of limitation

BRIEF DESCRIPTION OF THE DRAWINGS

FIG. 1E is a simplified illustration of a UAV, according to an example embodiment.

DETAILED DESCRIPTION

Figure 1A:
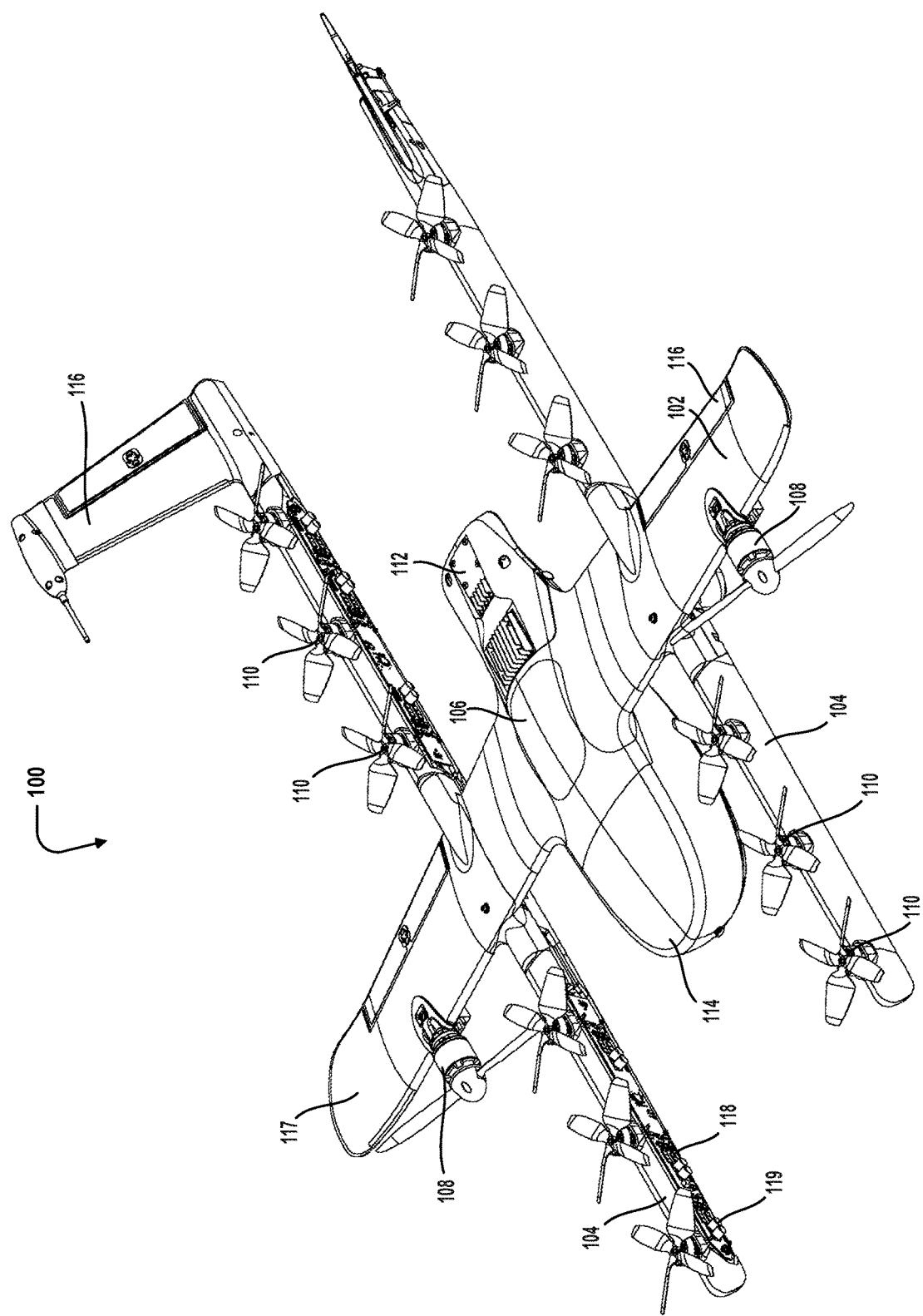
FIG. 1A is a simplified illustration of an unmanned aerial vehicle (UAV), according to an example embodiment.

Example methods, systems, and devices are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

The embodiments described herein relate to payload loading structures for unmanned aerial vehicles (UAVs). Aspects written in term of "loading," such as a payload loading structure, should be understood to not be limiting to "loading" functions or scenarios only. For example, unloading, maintenance, charging, and other interactions between a user, a UAV, a payload loading structure, or related components may occur at a payload loading structure or aspect thereof.

Exemplary embodiments may include, be implemented as part of, or take of the form of an aerial vehicle or system related thereto. In example embodiments, a UAV may include rotor units operable to provide thrust or lift for the UAV for transport and delivery of a payload. Herein, the terms "unmanned aerial vehicle" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

UAVs are increasingly being utilized to retrieve, carry, and deliver payloads across a variety of industries. As such, infrastructure is needed at pick-up and drop-off locations so that merchants, customers, and other users can utilize UAV delivery services. More particularly, payload loading systems may provide known, accessible, dedicated, and safe areas for a person or other device utilizing a UAV delivery service to load or unload a payload. Payload loading systems may include a loading structure that further includes a landing platform and a tether guide.

Advantageously, payload loading systems guide a tether so that the payload coupling apparatus, which is the point of interaction with the person or device loading a payload to the UAV, arrives at a target location. The target location includes an ergonomic location such that the payload coupling apparatus is accessible for a user. By developing the payload loading system that focuses on locating the payload coupling apparatus within the target location, less concern over the exact location and orientation (or heading) of the UAV is required. The tether guide provides the means to locate the payload coupling apparatus within the target location no matter the orientation or heading of the UAV. Thus, the UAV loading/unloading process does not require exact precision from the UAV controls, but instead a loading structure of the payload loading system makes up for an amount of error or imprecision in the controls, whether it be user or computer driven.

The advancement of payload loading systems also provides additional functionality to loading and unloading control schemes. For example, payload loading systems described herein do not require the UAV to land on a landing platform. The UAV may hover and pass over the loading structure and so long as the tether extended below the UAV is within a predetermined range, the tether guide will direct or steer the tether such that the payload coupling apparatuses arrives at the target location, rather than the UAV having to land at a precise location with a precise orientation.

While landing on the platform is not required, the payload loading system more easily locates the payload coupling apparatus at the target location if the UAV does land on a landing platform of the loading structure, for example. The landing platform may provide the means for the UAV to complete a variety of other tasks such as recharging or replacing batteries and uploading or downloading information from a network, among other possibilities, when the UAV lands.

Beneficially, payload loading systems, as described, may provide more people with access to UAV delivery services. Additionally, elevated landing platforms and tether guides as part of the loading structure may reduce the risk of injury to humans by increasing the distance between the UAV and the point of interaction (i.e., loading and unloading of a payload at the target location). Moreover, inherent features of the payload loading systems may allow for installation of such systems (or related devices and components thereof) in a variety of locations without impeding everyday life of people.

The Figures described in detail below are for illustrative purposes only and may not reflect all components or connections. Further, as illustrations the Figures may not reflect actual operating conditions, but are merely to illustrate embodiments described. Further still, the relative dimensions and angles in the Figures may not be to scale, but are merely to illustrate the embodiments described.

II. Illustrative Unmanned Vehicles

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
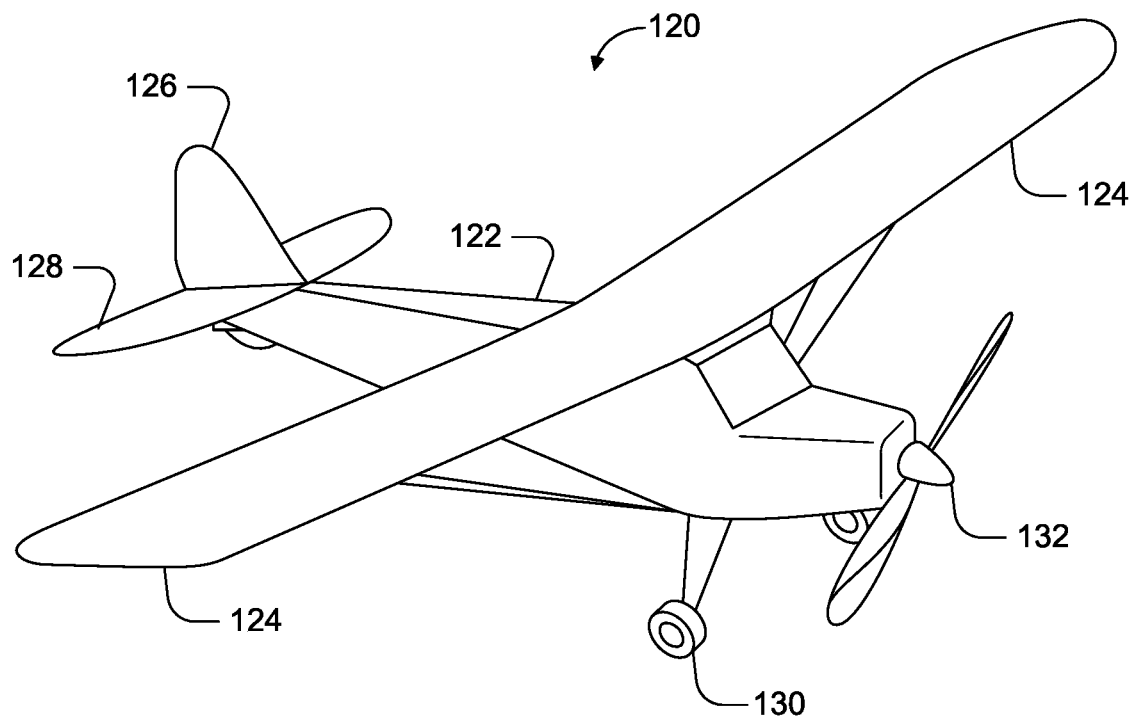
FIG. 1B is a simplified illustration of a UAV, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
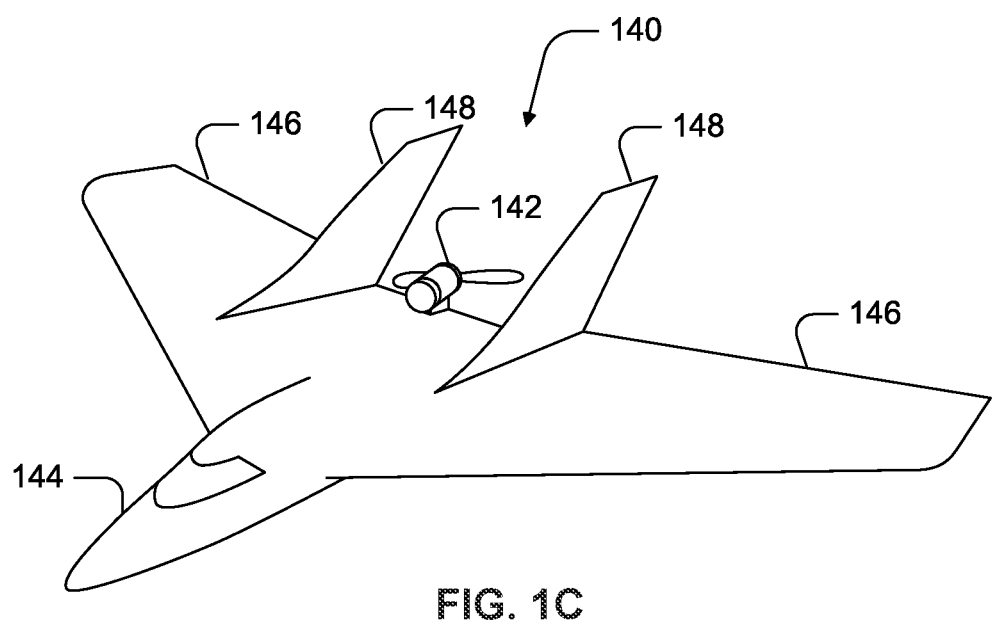
FIG. 1C is a simplified illustration of a UAV, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
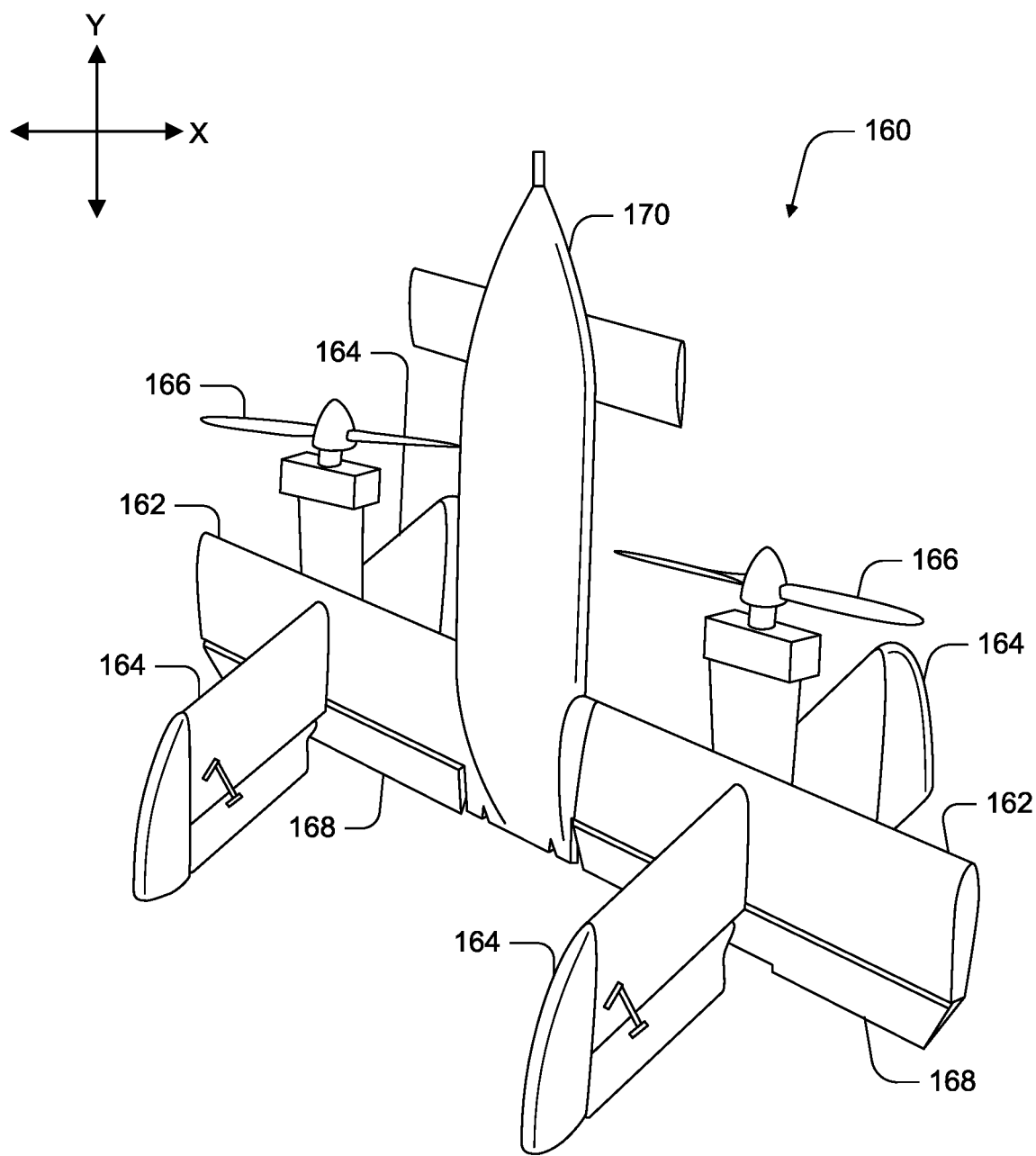
FIG. 1D is a simplified illustration of a UAV, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
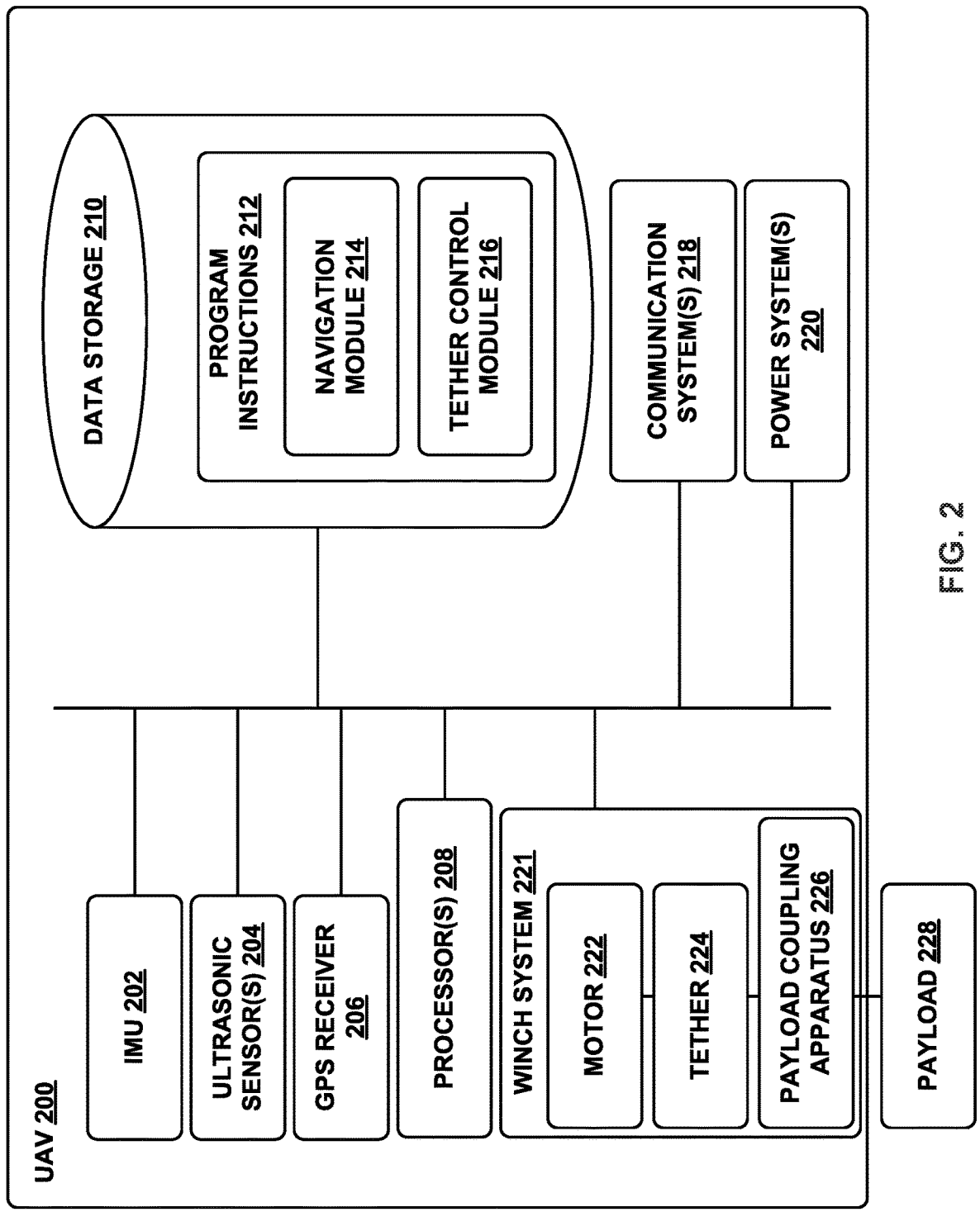
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 1100a, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In some embodiments, the control system 1120 may take the form of program instructions 212 and the one or more processors 208.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
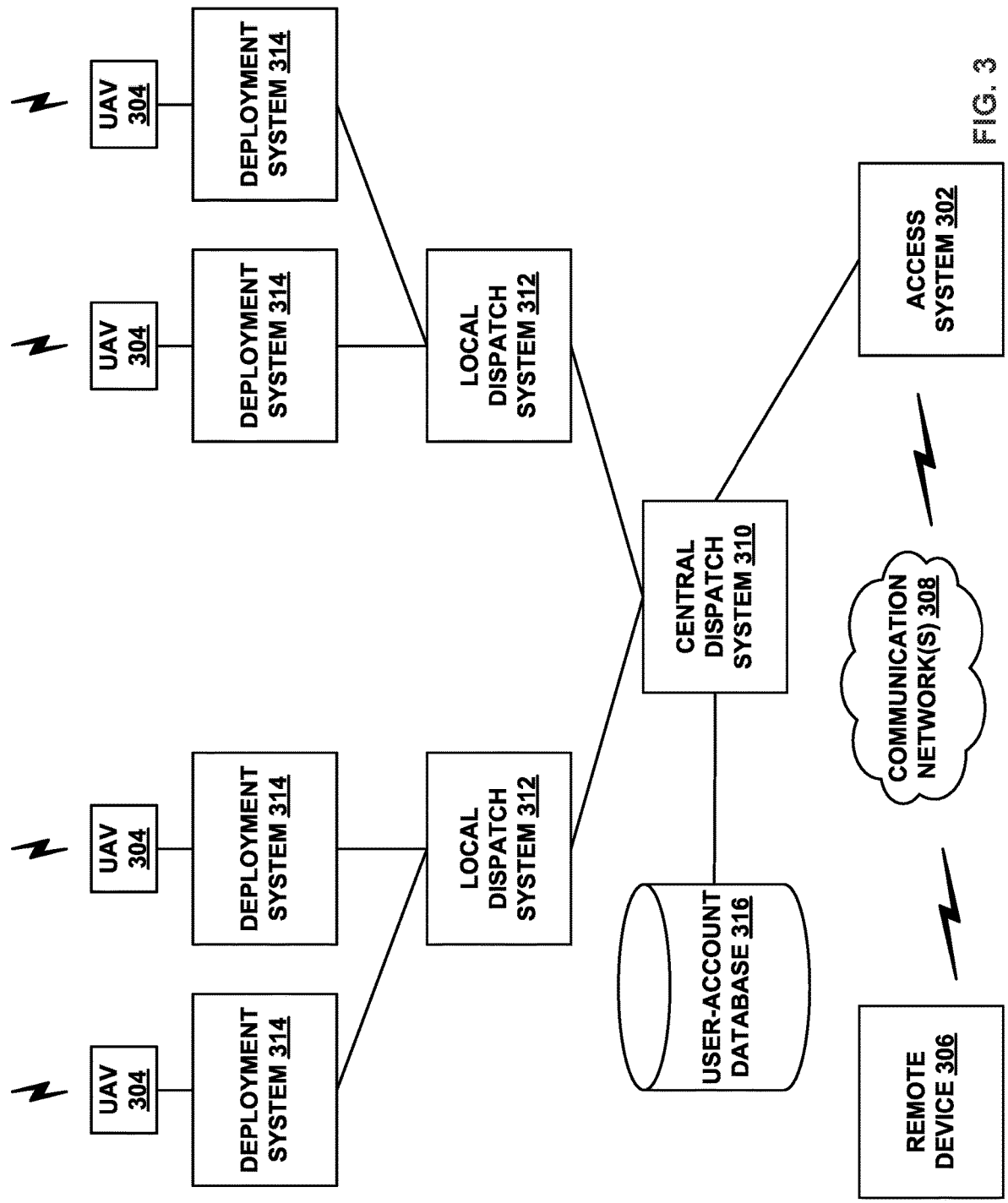
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Illustrative UAV Payload Loading Systems

Figure 4:
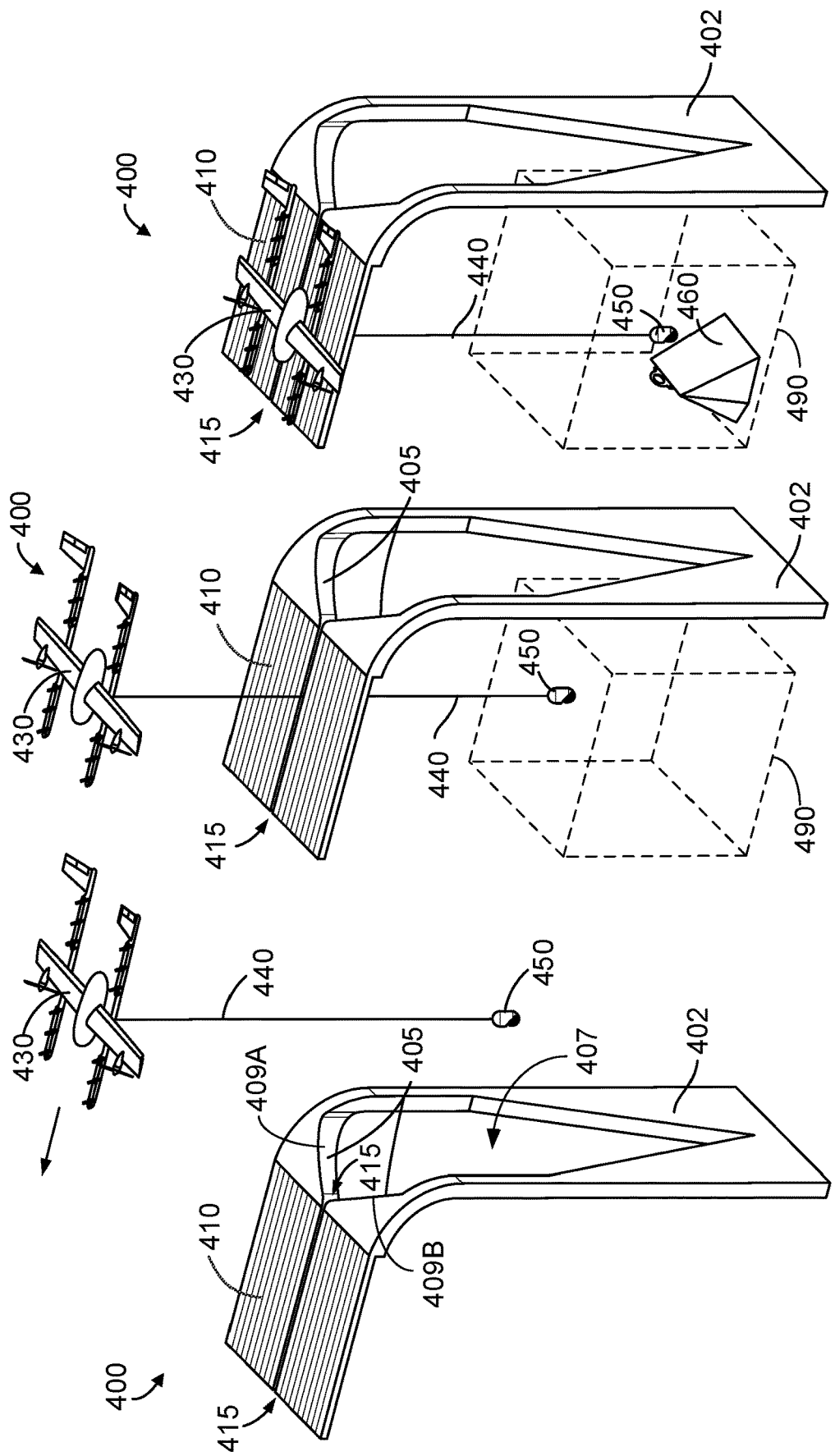
FIG. 4A depicts a payload loading system, according to an example embodiment.
FIG. 4B depicts a payload loading system, according to an example embodiment.
FIG. 4C depicts a payload loading system, according to an example embodiment.

FIG. 4A, FIG. 4B, and FIG. 4C depict a payload loading system 400, according to an example embodiment. The payload loading system 400 includes a loading structure 402 and a UAV 430. The loading structure 402 includes a tether guide 405 and a landing platform 410. The tether guide 405 includes a first edge 409A and a second edge 409B. The UAV 430 includes a retractable tether 440 and a payload coupling apparatus 450.

The UAV 430 may be similar to the UAVs described in FIGS. 1A-1E, FIG. 2, and FIG. 3 above. The UAV 430 includes components not depicted in FIGS. 4A-4C. For example, the UAV 430 may further include a winch system. The winch system may be similar to winch systems described above, including winch system 221 of FIG. 2, for example. The winch system may include the retractable tether 440. Other components of the UAV 430 may be similar in form and function as components described as part of the UAVs described in FIGS. 1A-1E.

The UAV 430 is coupled to a proximate end of the retractable tether 440. Moreover, the proximate end of the tether 440 may be coupled to the winch system of the UAV 430. The payload coupling apparatus 450 is coupled to the retractable tether 440 at a distal end of the tether 440. A payload 460 is coupleable to the retractable tether 440 at the payload coupling apparatus 450.

The loading structure 402 includes and defines a UAV approach opening 407. As the UAV 430 approaches the loading structure 402, as shown in FIG. 4A, if the retractable tether 440 is not already extended, the retractable tether 440 is extended from the UAV 430. The UAV approach opening 407 is large enough to not interfere with the payload coupling apparatus 450 as the UAV 430 comes even closer and begins to travel across (either by hovering over or on) the loading structure 402 and more particularly the landing platform 410. The tether guide 405 may direct the retractable tether 440 such that the payload coupling apparatus 450 pass through the UAV approach opening 407 while the UAV 430 approaches and travels across the landing platform 410.

As the UAV 430 continues from an initial approach position in FIG. 4A to the position shown in FIG. 4B where the UAV 430 has approached and traveled across a portion of the landing platform 410 and is hovering over the landing platform 410 of the loading structure 402, the tether guide 405 directs or steers the retractable tether 440 to a location where the retractable tether 440 pass through the landing platform 410. The tether guide 405 may direct or steer the retractable tether 440 when the retractable tether 440 comes into contact with the first edge 409A or the second edge 409B of the tether guide 405. The edges 409A-409B may be considered edges of at least a portion of the loading structure 410. At least a portion of the edges 409A-409B may be at an elevation above or below the elevation of the landing platform 410. Directing the retractable tether 440 includes steering or guiding the retractable tether 440 in a direction that may be different from a heading that the UAV 430 is traveling as the UAV 430 approaches and/or travels across the landing platform 410.

The tether guide 405 is coupled to the landing platform 410. Additionally, the landing platform 410 includes a channel 415. The channel 415 is a slot in the landing platform 410, that in some embodiments is a continuation of the tether guide 405 such that the channel 415 also directs or guides the retractable tether 440. As such, in at least some embodiments, the tether guide 405 includes the channel 415. In some examples, the tether guide 405 may funnel the retractable tether 440 towards the channel 415 or towards a center of the landing platform 410. In other examples, the tether guide 405 and the channel 415 may direct the retractable tether 440 as the UAV 430 approaches and travels across at least a portion of the landing platform 410 such that the payload coupling apparatus 450 arrives at a target location 490. In other words, as the UAV 430 travels across at least a portion of the landing platform 410 the retractable tether 440 passes through at least a portion of the channel 415 such that the payload coupling apparatus 450 arrives at the target location 490.

Within some embodiments, the tether guide 405 and the channel 415 may be constructed from a low friction material. Moreover, the tether guide 405 and the channel 415 may also include one or more rollers that are configured to rotate as the retractable tether 440 comes into contact with and moves along the tether guide 405 or channel 415. The rollers (or another aspect of the loading structure 402 in other examples) may provide feedback to the UAV 430, an operator, or to other components of the payload loading system 400. The feedback may include velocity, position, or other information of the UAV 430 and/or retractable tether 440, for example.

While the UAV 430 is shown in FIG. 4B as hovering above and having moved over a portion of the landing platform 410, in other embodiments the UAV 430 may land on the landing platform 410 and then proceed to travel across the landing platform 410 while the UAV 430 is in contact with the landing platform 410. Within examples, no matter if the UAV 430 lands or hovers, the landing platform 410 provides some level of environmental protection to users (humans or other devices) and the payload 460 the UAV 430 is picking up. The landing platform 410 maintains the UAV 430 a buffer distance, or safety distance, above the target location 490.

The target location 490 is a three-dimensional space that is easily accessed by a user, such as a consumer or merchant. In some embodiments, the target location 490 is at an ergonomic position for a user to load or unload the payload 460. In some regards, the target location 490 is at an ergonomic position for a user to load or unload the payload 460. While shown as a three-dimensional rectangular box in FIGS. 4B and 4C, the target location 490 may take any number of other shapes including being spherical or conical, among others. In some embodiments, the target location 490 may be a feature defined by the landing structure 402. For example, in FIGS. 4B and 4C, the target location 490 is under the landing platform 410 at a height that is readily accessible by a user, for example. Additionally, while the target location 490 provided in FIGS. 4B and 4C is relatively about the same width and length as the loading platform 410, in other embodiments the target location 490 may be relatively smaller than the landing platform 410. Within examples, the target location 490 may be a predetermined location known to a dispatch system as part of a UAV system (such as those described in FIG. 3). GPS or other systems or signals, included as part of the loading structure 402, and/or also onboard or transmitted to the UAV 430, may notify that the UAV 430 is in a position such that the payload coupling apparatus 450 should be within a given target location, such as the target location 490.

The payload loading system 400 may further include other features, such as notifying a user when the UAV 430 has arrived to pick up (or drop off) the payload 460. In some embodiments, the loading structure 402 may include a user interface to assist the user in preparing for delivery or pick-up. For example, a merchant may enter an address or other user information into the payload loading system 400 such that the UAV 430 is provided with relevant information to carry out the delivery of the payload 460.

In order to facilitate more efficient and simpler loading and unloading of a payload (such as payload 460), it is desirable for the payload coupling apparatus 450 to arrive at the target location 490 (as shown in FIG. 4B, for example), so that the payload 460 may be loaded to the UAV 430 via the retractable tether 440 by coupling the payload 460 to the payload coupling apparatus 450 while the payload coupling apparatus 450 is within the target location 490. In this regard, the payload 460 may be loaded to the payload coupling apparatus at or within the target location 490.

As depicted in FIG. 4C, the UAV 430 has landed on the landing platform 410. While landed, the UAV 430 may charge or replace batteries, and/or communicate with other aspects of a UAV system. Additionally, while landed, the UAV 430 may wait for a user or other device to load (or unload) the payload 460 onto the payload coupling apparatus 450. At least one advantage of the payload loading system 400 being configured to support the landing of the UAV 430 is that loading the payload 460 while the UAV 430 is landed saves battery energy of the UAV 430.

When the payload 460 is loaded to the payload coupling apparatus 450, one or more sensors on the UAV 430 may detect an increase in tension in the retractable tether 440. The UAV 430 may then begin to depart from the loading structure 402. This may be accomplished by beginning to hover (if not already hovering) and/or continuing to travel across the landing platform 410. In some embodiments, the retractable tether 440 may continue to pass through the rest or the entirety of the channel 415 (and/or the tether guide 405) as the UAV 430 departs the loading structure 402. Within examples, the channel 415 may be a slot that runs through the entirety of the loading platform 410.

As shown in FIGS. 4A-4C, and provided in further detail below for other particular embodiments, the tether guide 405 includes at least one edge (the first edge 409A and/or the second edge 409B) of the loading structure 402 that guides the retractable tether 440 towards or in the direction of the target location 490 such that the payload coupling apparatus 450 is also guided towards the target location 490. In some aspects, the tether guide 405 constrains the retractable tether 440 in at least one degree of freedom by preventing motion in that at least one direction. For example, the retractable tether 440 may contact the first edge 409A and then the retractable tether 440 be directed or forced in a direction that is different than the heading of the UAV 430. In some aspects, the first edge 409A may be at an angle relative to the heading of the UAV 430. The angle of the edge 409A may direct the retractable tether 440 along a heading that is different than the heading of the UAV. In some embodiments, the edges 409A-409B of the tether guide 405 are coupled to one or more corresponding edges of the channel 415. So, for example, the first edge 409A may be coupled to and continuous with an edge of the channel 415.

Moreover, the tether guide 450 passively guides a direction or path of the retractable tether 440 as the UAV 430 travels across the loading structure 402. So for example, if the UAV 430 was slightly misaligned, with slight error in heading among other possible reasons, rather than having to adjust or re-approach the loading structure 402 (or more particularly the target location 490), so long as the retractable tether 440 is within the UAV approach opening 407, the tether guide 405 angled towards a middle of the target location 490 and the platform 410 (in this embodiment) will be directed or funneled such that the payload coupling apparatus 450 will arrive at the target location 490. The UAV approach opening 407 is wider and larger than the channel 415, so the UAV 430 does not have to get the retractable tether 440 aligned with the channel 415 on its own, but instead the tether guide 450 as a feature of the loading structure 402 will provide the additional alignment and guidance so the payload coupling apparatus 450 arrives in the target location 490.

Additionally, FIGS. 4A-4C depict an embodiment in which the tether guide 405 and the channel 415 direct or steer the retractable tether 440 such that the UAV 430 and the payload coupling apparatus 450 travel in substantially parallel headings. Furthermore, the tether guide 405 and/or channel 415 may reduce the movement of the payload coupling apparatus 450, such any swinging or similar movement of the payload coupling apparatus 450 while the payload 460 may be loaded to the UAV 430.

Figure 5:
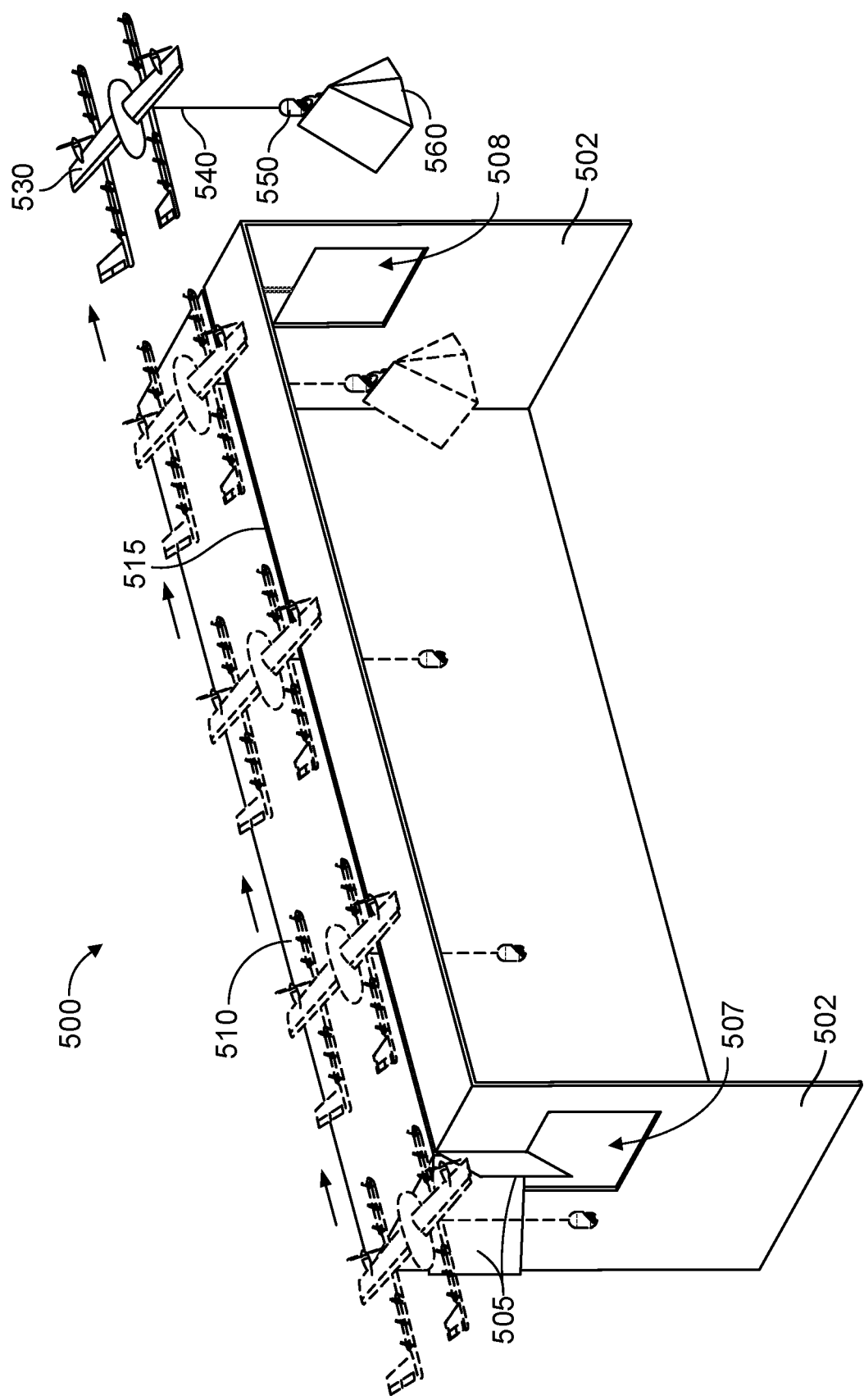
FIG. 5 depicts a payload loading system, according to an example embodiment.

FIG. 5 depicts a payload loading structure 500. The payload loading structure 500 includes a loading structure 502 and a UAV 530. The payload loading structure 500 may include components similar to the payload loading structure 400 provided in FIGS. 4A-4C, even if those components are not explicitly labeled. Moreover, features of the payload loading structure 500 may be similar in form and function to components of the payload loading structure 400. For example, the loading structure 502 and the UAV 530 may be similar to the loading structure 402 and the UAV 430 of FIGS. 4A-4C.

As illustrated in FIG. 5, the loading structure 502 may be a structure as part of a building or warehouse. Within examples, the loading structure 502 is coupled to, or included as part of a merchant module. The merchant module may include a warehouse or distribution center. A merchant may sell or execute deliveries out via a UAV delivery system out of the merchant module including the loading structure 502. The loading structure 502 includes a landing platform 510. The landing platform 510 may include at least a portion of the top or roof of the merchant module. A channel 515 may be included as part of the landing platform 510 and define a slot that extends from a UAV approach opening 507 to a UAV departure opening 508. The channel 515 may be considered coupled to and an extension of the tether guide 505. The UAV approach opening 507 may be sized to not interfere with a payload coupling apparatus 550 coupled to a tether 540 that is extended from the UAV 530. The tether 540 may also be a retractable tether. The UAV departure opening 508 may be sized to not interfere with a payload coupling apparatus 550 coupled to a payload 560. As such, in some embodiments, the UAV departure opening 508 may be larger than the UAV approach opening 507. The UAV approach opening 507 and the UAV departure opening 508 are located within walls of the loading structure 502. In some examples, the UAV approach opening 507 and the UAV departure opening 508 are located in the walls of a merchant module.

As shown in FIG. 5, as the UAV 530 approaches the landing platform 510 of the loading structure 502, a tether guide 505 may direct or align the tether 540 into the channel 515. A target location (not depicted) may include the area within the loading structure 502, or within the merchant module, under the channel 515. This arrangement allows a user, such as a merchant, to load the payload 560 to the payload coupling apparatus 550 as the UAV 530 travels across the loading platform 510 while the UAV 530 is maintained safely outside of the loading structure 502 (the merchant module, for example). As the UAV 530 approaches the loading structure 502, the UAV 530 does not have to be precisely aligned with the channel 515.

For example, the UAV 530 may travel along a heading substantially parallel to the channel 515, but two feet left or right of the channel 515 itself. The UAV 530 does not need to adjust the approach or flight path because the tether guide 505, with a maximum width of approximately four feet (in this example), will direct or steer the tether 540 to the channel 515 such that the payload coupling apparatus arrives at the target location. Moreover, the channel 515 may limit any swing of the payload coupling apparatus 550 as the UAV 530, tether 540, and payload coupling apparatus 550, move across and through (respectively) the loading structure 502. In other words, the tether guide 505 and the channel 515 may constrain the movement of the tether 550 in at least one degree of freedom (left or right of the channel 515 in this example)

While the channel 515 is shown in a straight line in FIG. 5, other shapes are considered herein. For example, the channel 515 may be curved in order to direct and guide the tether 540 such that the payload coupling apparatus 550 reaches the target location within the merchant module or loading structure 502. Similarly, while the channel 515 is the only channel shown in FIG. 5, multiple channels are considered herein. For example, the channel 515 may split into one or more channels and the tether 540 may be routed into a specific channel based on a specific target location that the payload coupling apparatus 550 has been assigned to arrive within to pick up (or drop off) a payload. Additionally, while the one UAV 530 is depicted in FIG. 5, two or more UAVs may travel across the landing platform 510 and the loading structure 502 at one time. For example, UAVs may line up and each corresponding payload coupling apparatus may enter through the UAV approach opening 507 one at a time, but two or three payload coupling apparatuses (corresponding to two or three UAVs) may be within the loading structure 502 so multiple users may load a payload to each of the payload coupling apparatuses simultaneously or approximately at the same time.

While FIG. 5 was described generally as picking up the payload 560 from a merchant module, it is also considered herein that the loading structure 502 could also be a residence or common location in a community that is designated as a location where deliveries from a UAV delivery service may be dropped off. Other similar design considerations are contemplated.

Continuing with the Figures, FIGS. 6A-6D depict a payload loading system 600. The payload loading system 600 includes a loading structure 602 and a UAV 630. The payload loading structure 600 may include components similar to the payload loading structure 500 provided in FIGS. 5 and/or the payload loading structure 400 provided in FIGS. 4A-4C, even if those components are not explicitly labeled. Moreover, features of the payload loading structure 600 may be similar in form and function to components of the payload loading structure 500 and/or the payload loading structure 400. For example, the loading structure 602 and the UAV 630 may be similar to the loading structure 502 and the UAV 530 of FIG. 5.

The UAV 630 is shown approaching the landing structure 602. The UAV 630 includes a tether 640 and a payload coupling apparatus 650. The landing structure 602 includes a landing platform 610 (dividing into a plurality of landing platform portions 610A-610E), and a tether guide. The tether guide includes a plurality of lower tether guide edges 620A-620D. The plurality of lower tether guide edges 620A-620D of the tether guide define a plurality of tether paths 622A-622C. Each of the plurality of lower tether guide edges 620A-620D may be constructed from elements of the loading structure 602, such as partitions, stanchions, or pipes, among other possibilities. The tether guide further includes a plurality of upper tether guide edges 610AA, 610BA, 610BB, 610CB, 610CC, 610DC, 610DD, and 610ED. The plurality of upper tether guide edges 610AA, 610BA, 610BB, 610CB, 610CC, 610DC, 610DD, and 610ED are edges of the landing platform 610 that includes the plurality of landing platform portions 610A-610E. Furthermore, a plurality of channels 615A-615D are between pairs of the plurality of platform portions 610A-610E. As such, the landing platform 610 includes at least one channel, where each channel is between two of the landing platform portions 610A-610E.

The lower tether guide edges 620A-620D, the upper tether edges, and/or the channels 615A-615D may be constructed from low friction material such that the tether 640 more easily slides or is guided by the respective features of the tether guide when the tether 640 is guided or positioned within the loading structure 602. Moreover, the various features of the loading structure 602 and tether guide may include force, touch, or other sensing means that allow the UAV 630 to determine a position of the tether 640 within the loading structure 602.

As depicted in FIGS. 6A-6D, each of the channels 615A-615D has a pair of upper tether guide edges that direct or funnel the tether 640 into the respective channel. For example, the channel 615A is between the platform portion 610A and the platform portion 610B. Further, the tether guide edge 610AA (of platform portion 610A) and the tether guide edge 610BA (of platform portion 610B) are angled such that the tether 640 is directed to channel 615A. Similarly, the channel 615B is between the platform portion 610B and the platform portion 610C. Further, the tether guide edge 610BB (of platform portion 610B) and the tether guide edge 610CB (of platform portion 610C) are angled such that the tether 640 is directed to channel 615B. The arrangement of the similar features of the upper tether guide (edges of and channels between the plurality of landing platform portions), are similar.

When the tether 640 is guided by the upper tether guide, the tether 640 will come into contact with at least one of the plurality of upper tether guide edges and contact and pass through at least a portion of one of the channels such that the payload coupling apparatus arrives at a target location 690. The respective tether guide edges and channel may contact and interact with an upper portion of the tether 640 that is closer to a proximate end of the tether 640 where the tether 640 is coupled to the UAV 630. As shown in FIGS. 6A-6D, none of the channels 615A-615D are in plumb with (or vertically aligned with) any portion of the target location 690. Further, the upper tether guide (i.e. the tether guide edges and the channels) directs the tether 640 in a direction that has substantially the same heading as the heading or flight path of the UAV 630 while the tether 640 is passing through the channel.

The lower tether guide edges 620A-620D are located at a position below the plurality of platform portions 610A-610E. Additionally, the target location 690 is located just below a portion of the lower tether guide edges 620A-620D. The plurality of lower tether guide edges 620A-620D direct the tether 640 as the UAV 630 travels across one or more of the platform portions 610A-610E such that the payload coupling apparatus 650 arrives at the target location 690. As described above, the plurality of tether guide edges 620A-620D define the plurality of tether paths 622A-622C. The tether 640, and more particularly a lower portion of the tether 640 closer to a distal end of the tether 640 that is coupled to the payload coupling apparatus, comes into contact with and interacts with the plurality of tether guide edges 620A-620D. As such, the plurality of the lower tether guide edges 620A-620D direct the tether 640 along one of the plurality of tether paths 622A-622C such that the payload coupling apparatus 650 arrives at the target location 690 as the UAV travels across at least a portion of one or more platform portions 610A-610E. In other words, at least a portion of the tether 640 follows one of the tether paths 622A-622C as the UAV 630 travels across the landing platform.

Each of the tether paths 622A, 622B, and 622C, lead through a portion of the target location 690, and as such, each of the tether paths 622A, 622B, and 622C (defined by the tether guide edges 620A-620D) direct at least a portion of the tether 640 such that the payload coupling apparatus 650 arrives at the target location 690. Additionally, the plurality of tether guide edges 620A-620D may be shaped and angled so that the payload coupling apparatus 650 reaches the target location 690. The lower portion of the tether 640 travels along one of the tether paths 622A-622C in arriving at the target location 690. Within examples, and as shown in FIGS. 6A-6D, at least a portion of each of the tether paths 622A, 622B, and 622C defined by the plurality of tether guide edges 620A-620D may put the tether 640 on a heading or direction that is different than a heading or direction that the UAV 630 is traveling. Further then, a path that the UAV 630 travels (e.g., a flight path), may be in a different heading than at least a portion of the tether 640 following one of the tether paths 622A-622C.

Within further embodiments, aspects of the loading structure 602 may be actuated such that the payload coupling apparatus 650 is guided to the target location 690. For example, a specific target location (such as the target location 690) may be chosen based on contents of a payload to be dropped off or picked up. One or more the lower tether guide edges 620A-620D may be actuated so that a given tether path is shifted to lead the tether 640 to a predetermined target location. For example, once a tether has entered the loading structure 602, the payload loading system 600 may determine a next payload to be picked up, and then shift the lower tether guide edges 620A-620D to guide the tether 640 such that the payload coupling apparatus 650 reaches the target location 690. In other examples, other features such as a channel of the loading structure 602 may also be movable. Actuated mechanical features of the loading structure 602 may provide more flexibility to get the payload coupling apparatus 650 to a specific, predetermined target location.

The embodiment of FIGS. 6A-6D may be further understood by going through each of the FIGS. 6A-6D as the UAV 630 approaches the landing structure 602, travels across the platform 610, and providing how the payload coupling apparatus 650 arrives at the target location 690.

Figure 6A:
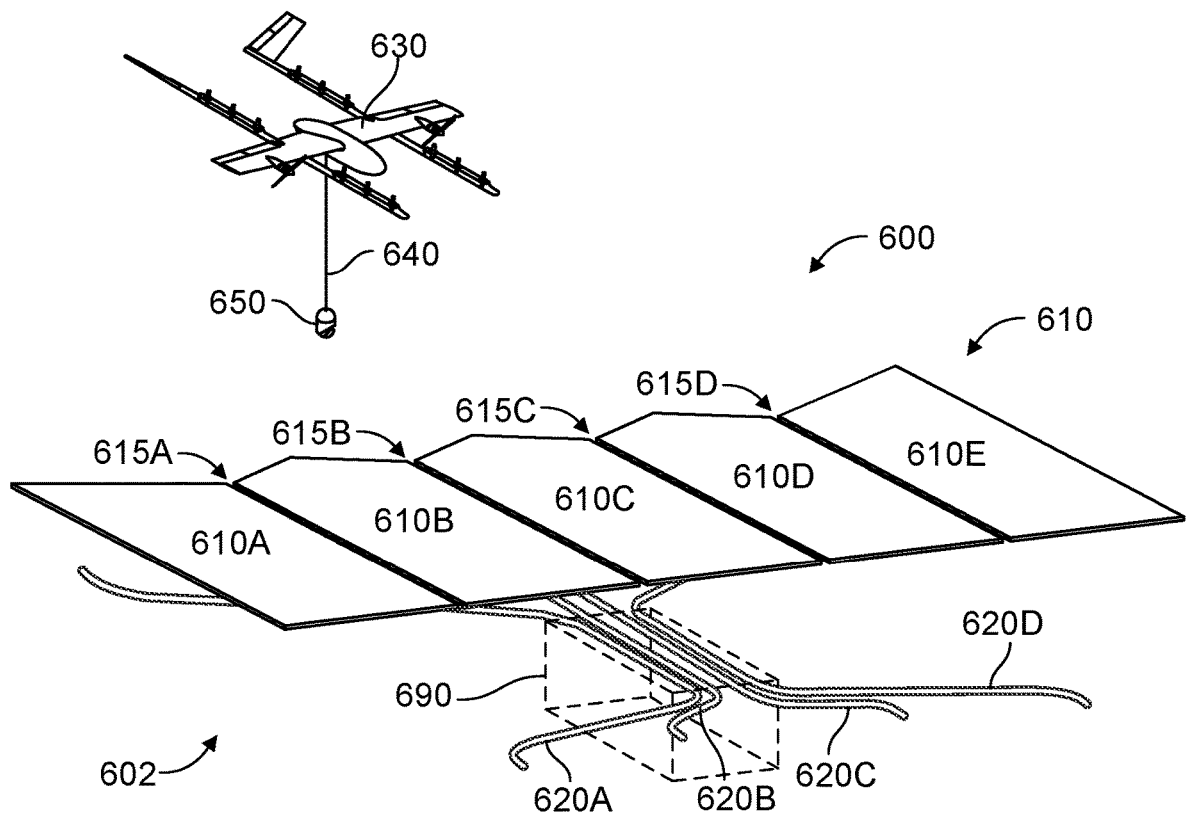
FIG. 6A depicts a payload loading system, according to an example embodiment.

Beginning with FIG. 6A, the UAV 630 is approaching the landing structure 602 with the tether 640 extended a distance that is greater than a vertical distance between the platform portions 610A-610E and the tether guide edges 620A-620D. Additionally, the tether 640 must be extended a distance that the payload coupling apparatus 650 reaches the target location 690 with the UAV 630 above on or hovering over the landing platform 610. The features described above provide that so long as the UAV 630 approaches within a width of the landing platform 610 (i.e., the outer edge of platform portion 610A to the outer edge of platform portion 610E), the tether 640 will be guided by the tether guide(s) and the payload coupling apparatus 650 will arrive at the target location 690. Additionally, it is worth noting that while the tether guide edges shown are located on one side of the platform portions 610A-610E, in other embodiments the platform portions 610A-610E may have the same or similar shape mirrored on the other side of the platform in order to allow the UAV 630 to land from either direction. Moreover, while certain angles and shapes are shown, others are possible and contemplated herein.

Figure 6B:
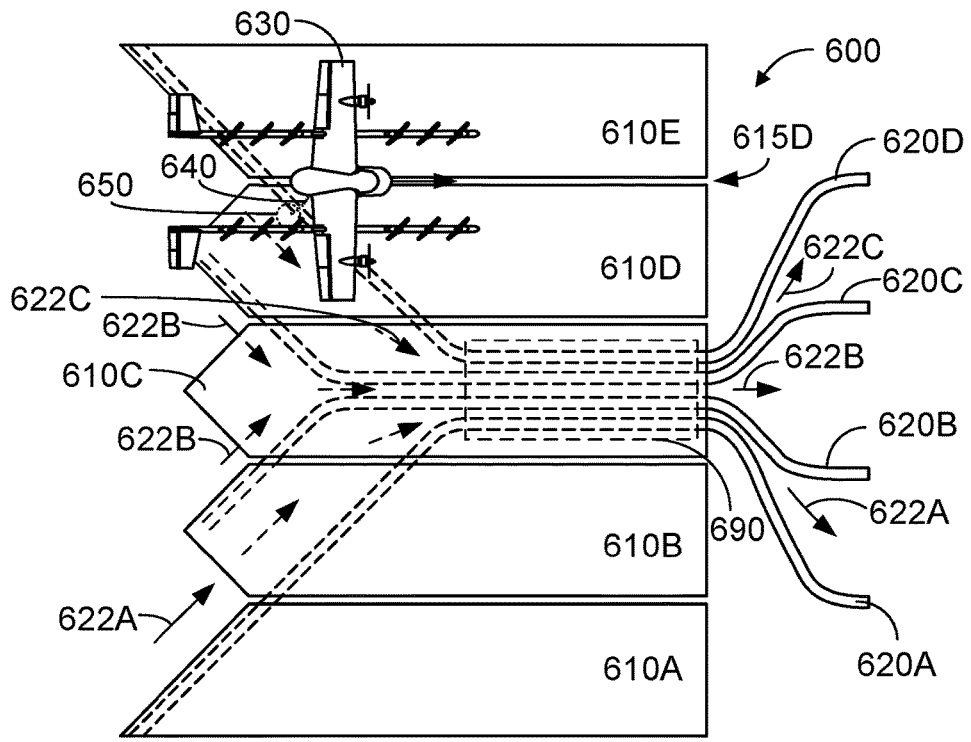
FIG. 6B depicts a payload loading system, according to an example embodiment.

Continuing to FIG. 6B, the UAV 630 has landed on the landing platform 610, and more particularly has landing on platform portions 610E and 610D. As the UAV 630 made the landing, the tether 640 was directed by at least the tether guide edge 620D and possible one or both of the tether guide edges 610ED and/or 610DD. As shown in FIG. 6B, the upper portion of tether 640, nearer the UAV 630, is passing through the channel 615D, between the two platform portions 610E and 610D. Based on the location on the platform 610 that the UAV 630 landed, the lower portion of the tether 640, nearer the payload coupling apparatus 650, and the payload coupling apparatus 650 itself, is following the tether path 622C defined between the tether guide edge 620D and 620C. If the UAV 630 had landed in a position such that the upper portion of the tether 640 ended up going through channel 615B or 615C, the lower portion of the tether 640 and the payload coupling apparatus 650 would follow tether path 622B. Further, if the UAV 630 had landed in a position such that the upper portion of the tether 640 ended up going through channel 615A, the lower portion of the tether 640 and the payload coupling apparatus 650 would follow tether path 622A. As shown in FIG. 6B, at this point while the UAV 630 has one heading along a flight path (e.g., directly right to left on the page), the payload coupling apparatus 650 and a portion of the tether 640 follow the tether path 622C at a different heading. The tether path 622C directs the tether 640 such that the payload coupling apparatus 650 will arrive at the target location 690.

Figure 6C:
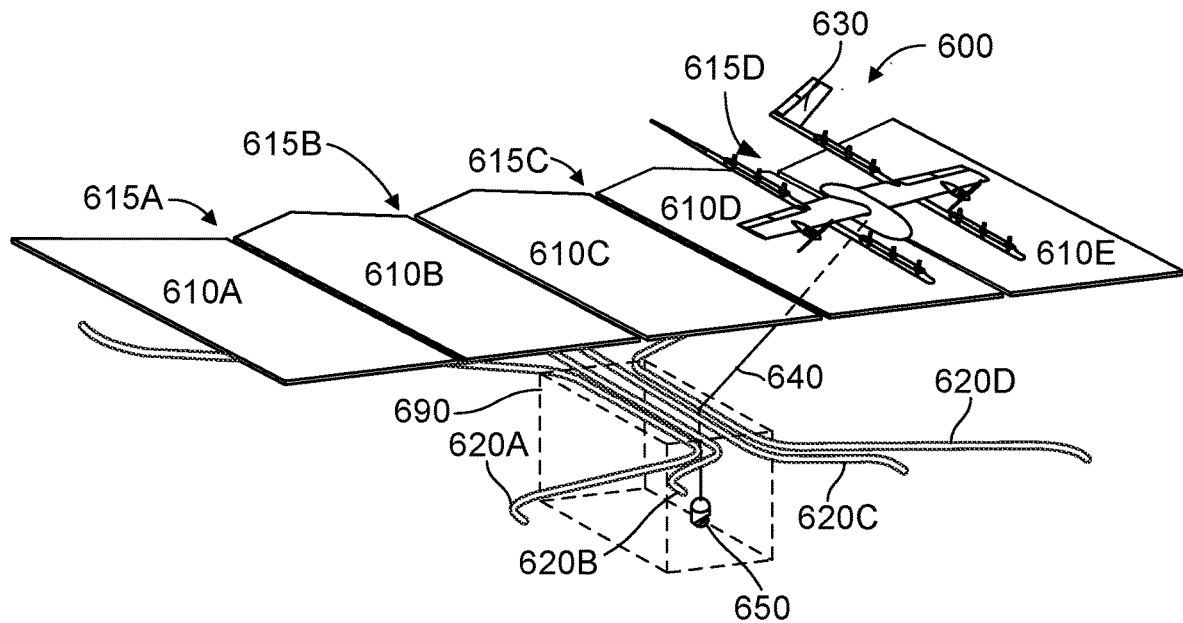
FIG. 6C depicts a payload loading system, according to an example embodiment.
Figure 6D:
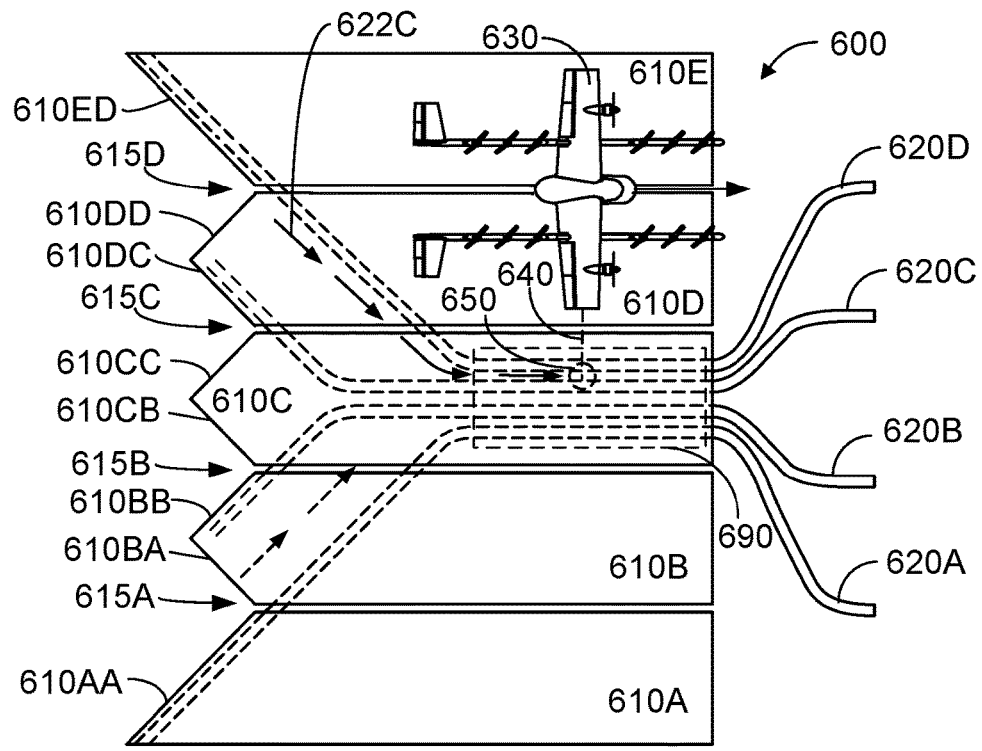
FIG. 6D depicts a payload loading system, according to an example embodiment.

FIGS. 6C and 6D are different views depicting the UAV 630 in the same position. The UAV 630 has traveled across the landing platform 610 and as the UAV 630 has traveled, the payload coupling apparatus 650 has arrived at the target location 690. The tether 640 followed the tether path 622C as the tether 640 was directed and guided by the lower tether guide edge 620D of the tether guide. As shown in FIG. 6D, a top view of the payload loading system 600, the UAV 630 is off-plumb from the payload coupling apparatus 650 as well as the target location 690. As such, without the use of the lower edges of the tether guide, the payload coupling apparatus 650 would be located directly below the UAV 630 and not within the target location 690, in some examples. As such, FIGS. 6A-6D provide various elements of an example as to how a tether guide may direct a tether such that the payload coupling apparatus arrives at the target location, even if the UAV is not located immediately above the target location. The payload loading system provides the features necessary to locate the payload coupling apparatus in the target location.

Figure 7:
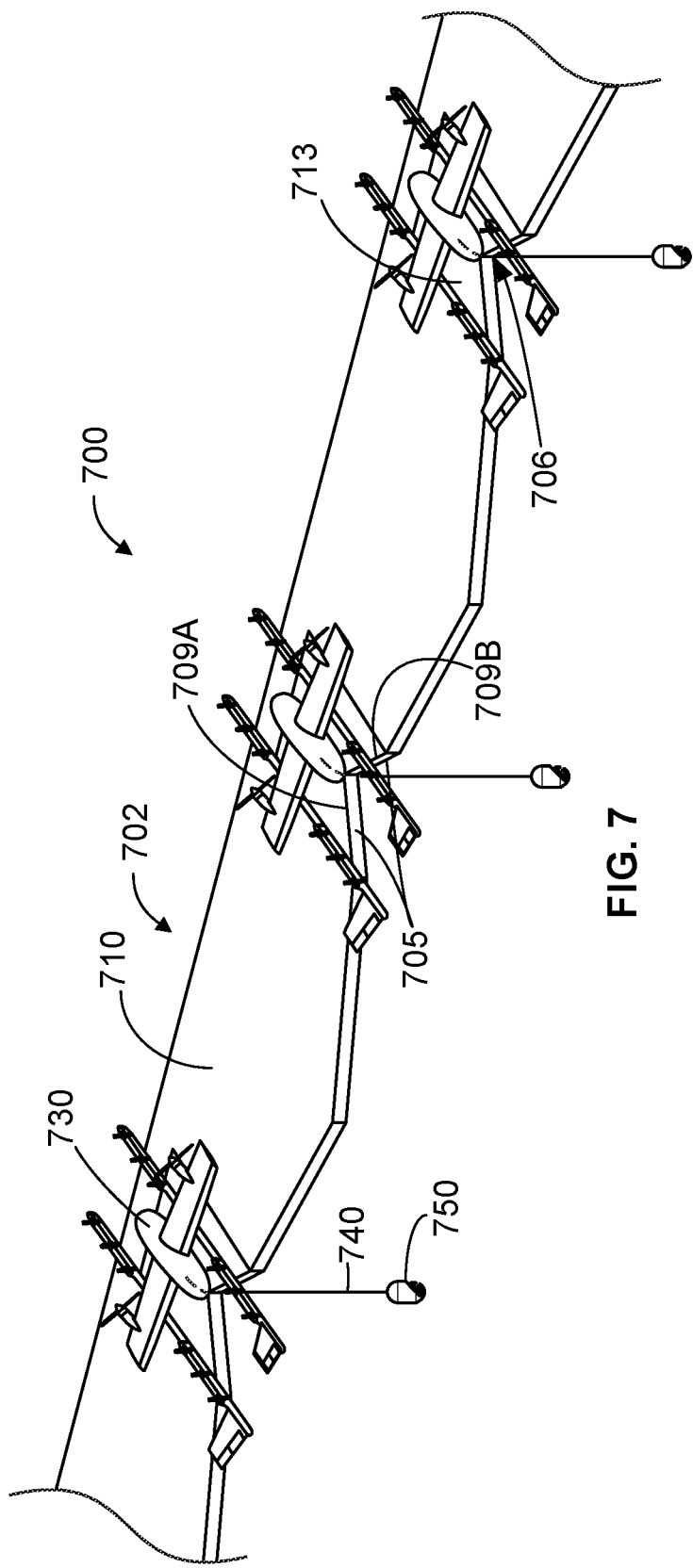
FIG. 7 depicts a payload loading system, according to an example embodiment.

FIG. 7 depicts yet another embodiment of a payload loading system 700. The payload loading system 700 includes a plurality of UAVs 730 and a loading structure 702. The loading structure 702 includes a landing platform 710 and a plurality of landing pads 713. The payload loading structure 700 may include components similar to the payload loading structure 600 provided in FIGS. 6A-6D, the payload loading structure 500 of FIG. 5, and/or the payload loading structure 400 provided in FIGS. 4A-4C, even if those components are not explicitly labeled. Moreover, features of the payload loading structure 700 may be similar in form and function to components of the payload loading structure 600, the payload loading structure 500, and/or the payload loading structure 400. For example, the loading structure 702 and the UAV 730 may be similar to the loading structure 602 and the UAV 630 of FIGS. 6A-6D.

The UAVs 730 each include a tether 740 and a payload coupling apparatus 750. The UAVs 730 are located on one of the plurality of landing pads 713. While in contact with the landing pad, the UAVs 730 may charge a battery, among other tasks described herein. A plurality of tether guides 705, one corresponding to each of the landing pads 713, are configured such that when one of the UAVs 730 is on the landing pad 713, the tether guide 705 maintains an alignment of the tether 740 such that the payload coupling apparatus 750 is within a target location.

Moreover, when one of the UAVs 730 lands on one of the landing pads 713, the edges and angle of the tether guide 705 are such that the tether 740 is directed or funneled to an apex 706 of the tether guide 705. The apex 706 is where a first edge 709A of the tether guide 705 and a second edge 709B of the tether guide 705 meet. The first edge 709A and the second edge 709B may be constructed from a low friction material such that the tether 740 is guided and more easily positioned by the tether guide 705. Positioning of the tether 740 in the apex 706 of the tether guide 705 may limit any movement of the tether 740 as well as the payload coupling apparatus 750. In other examples, the apex 706 may include a roller configured to rotate as the tether 740 is reeled-in or payed-out during a loading or unloading process. Moreover, the roller (or another sensing feature in other embodiments) of the apex 706 may enable a winch system of the UAV 730 to sense or determine that a payload has been loaded to or unloaded from the payload coupling apparatus 750. Furthermore, no matter the heading or orientation of the UAV 730, so long as the UAV 730 lands on one the landing pads 713, the tether 740 will hang from the apex 706 of the tether guide 705.

The landing platform 710 may be coupled to a side or wall merchant module. For example, the landing platform 710 depicted in FIG. 7 may be coupled to a wall of a warehouse such that the landing platform 710 is cantilevered off the wall. One advantage of the landing platform 710 is that it may be easily installed on existing structures with minimal impact to the existing structure. Further, while three landing pads 713 with three UAVs 730 are shown, more or less of both are contemplated herein.

Figure 8A:
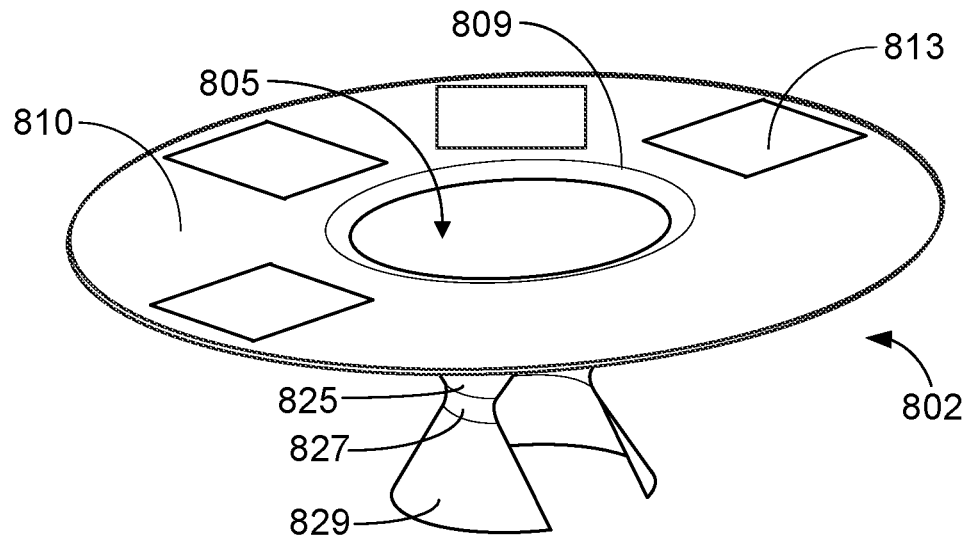
FIG. 8A depicts a payload loading system, according to an example embodiment.
Figure 8B:
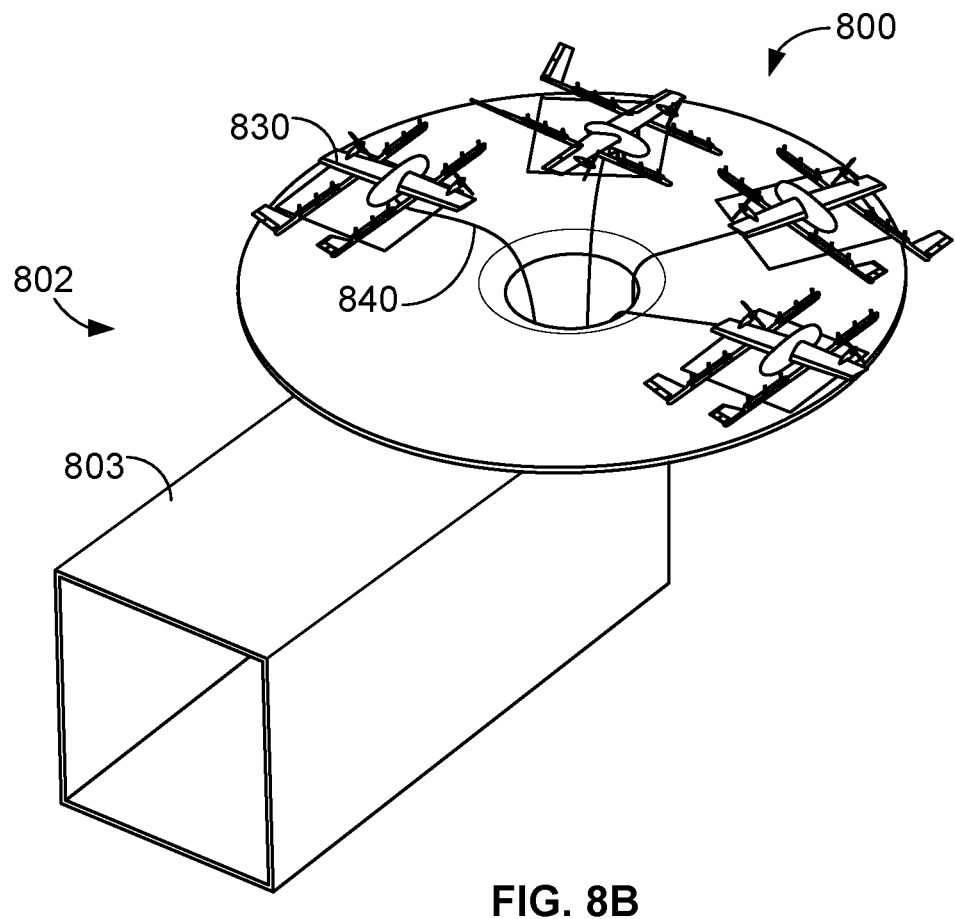
FIG. 8B depicts a payload loading system, according to an example embodiment.
Figure 8C:
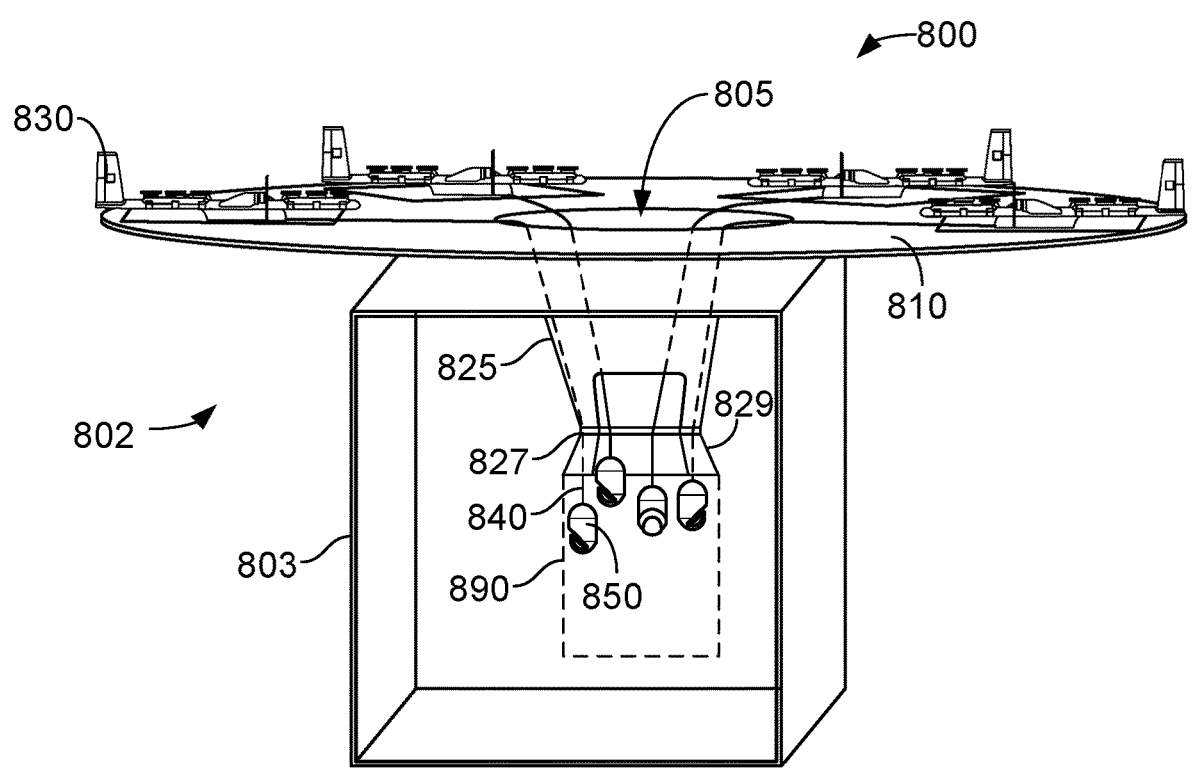
FIG. 8C depicts a payload loading system, according to an example embodiment

FIGS. 8A-8C illustrate a payload loading system 800. The payload loading system 800 includes a plurality of UAVs 830 and a loading structure 802. The loading structure 802 includes a landing platform 810 and a plurality of landing pads 813. The payload loading structure 800 may include components similar to the payload loading structure 700 provided in FIG. 7, the payload loading structure 600 provided in FIGS. 6A-6D, the payload loading structure 500 of FIG. 5, and/or the payload loading structure 400 provided in FIGS. 4A-4C, even if those components are not explicitly labeled. Moreover, features of the payload loading structure 800 may be similar in form and function to components of the payload loading structure 600, the payload loading structure 600, the payload loading structure 500, and/or the payload loading structure 400. For example, the loading structure 802 and the UAVs 830 may be similar to the loading structure 702 and the UAVs 730 of FIG. 7.

FIG. 8A depicts the loading platform 810 and a tether guide 805 of the loading structure 802. The tether guide 805 is coupled to the loading platform 810. Moreover, the tether guide 805 is conical. The tether guide 805 may have an edge 809. The tether guide 805 may be coupled to the loading platform 810 at the edge 809. The edge 809 may be circular in shape.

The conical tether guide 805 extends down from the landing platform 810 towards a target location. The tether guide 805 includes a first tapered portion 825, a middle portion 827, and a second tapered portion 829. The first tapered portion 825, the middle portion 827, and the second tapered portion 829 are concentric. The first tapered portion 825 is coupled to the landing platform 810 at a proximate end of the first tapered portion 825. Further, a diameter of the first tapered portion 825 at the proximate end of the first tapered portion 825 is greater than a diameter of a diameter of the first tapered portion 825 at a distal end of the first tapered portion 825. A proximate end of the second tapered portion 829 may be coupled to the distal end of the first tapered portion 825. In other examples, such as shown in FIGS. 8A-8C, the distal end of the first tapered portion 825 may be coupled to the middle portion 827. Also, the proximate end of the second tapered portion 829 may be coupled to the middle portion 827. The middle portion 827 is cylindrical and may extend vertically between the first tapered portion 825 and the second tapered portion 829. The middle portion 827 may have a diameter equal to the diameter of the distal end of the first tapered portion 825.

Additionally, a diameter of the proximate end of the second tapered portion 829 may be the same as the diameter of the distal end of the first tapered portion 825. A diameter of a distal end of the second tapered portion 829 is greater than the diameter of the proximate end of the second tapered portion 829.

As depicted in FIG. 8B, the loading structure 802 may also include a merchant module 803. The merchant module 803 may include a food truck, a building, a warehouse, a retail outlet, among other possibilities. The landing platform 810 and the tether guide 805 may be coupled to and/or installed in the merchant module 803. The UAVs 830 may land on the landing pads 813 on the landing platform 810 in a manner such that a payload coupling apparatus 850 coupled to a tether 840 of one of the UAVs 830 is deposited within the conical tether guide 805. The tether 840 may extend from the UAV 830 through the tether guide 805 to a target location 890.

As provided in FIG. 8C, the payload coupling apparatus 850 may be directed or guided to the target location 890 within the merchant module 803 as the UAV 830 approaches the landing platform 810. The tapered design of the tether guide 805, and in particular the outward taper of the second tapered portion 829 described above allows the payload coupling apparatus 850 and a payload coupled thereto to enter and exit the merchant module 803 and the tether guide 805 without getting caught on an edge of the tether guide 805. Within examples, the tether 840 may hang from the distal end of the first tapered portion 825. In other words, the tether 840 may be in contact with the conical tether guide 805 at the distal end of the first tapered portion 825 when the payload is loaded to, or unloaded from the payload coupling apparatus 850. In some embodiments, the distal end of the first tapered portion 825 and the proximate end of the second tapered portion 829 may be the same.

The payload loading system 800 may allow for the grouping of multiple payload coupling apparatuses in one location at a single tie, such as the target location 890. This configuration may be preferable for some merchants or other users based on the need and available space for integration of a payload loading system to utilize UAV delivery services.

Figure 9A:
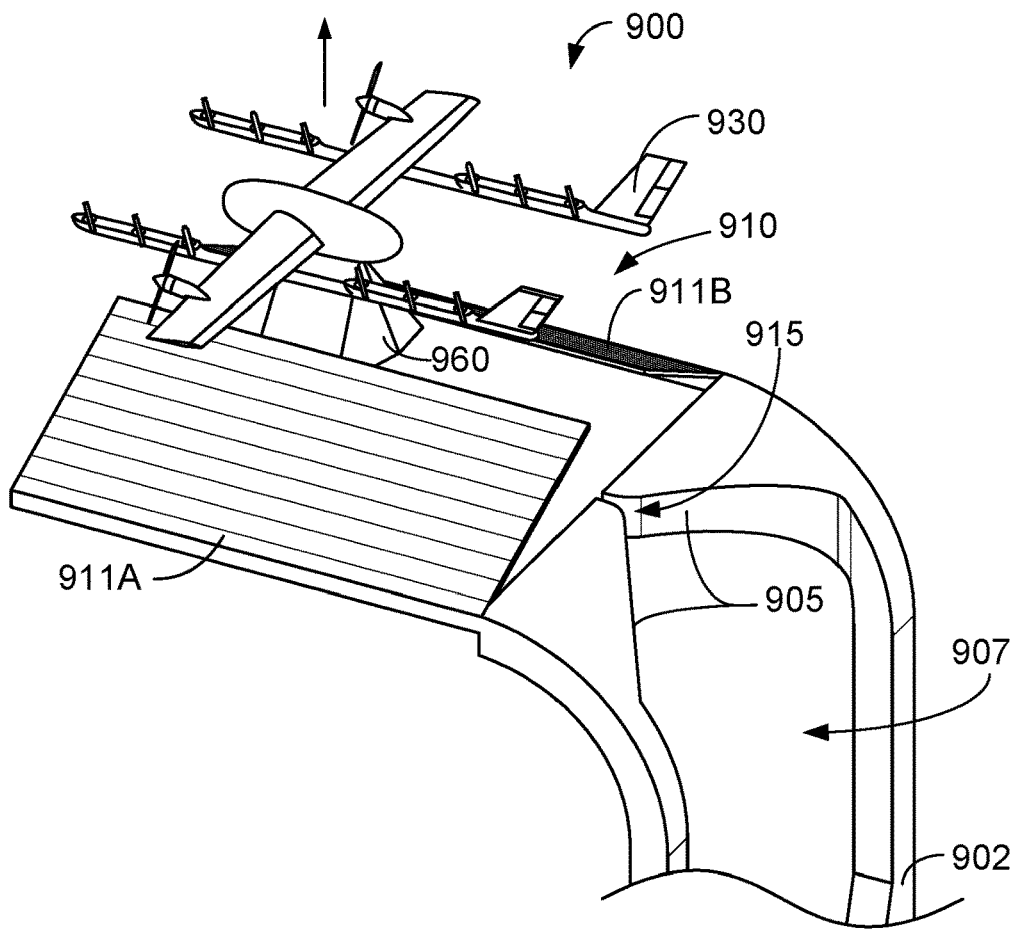
FIG. 9A depicts further aspects of a payload loading system, according to an example embodiment.
Figure 9B:
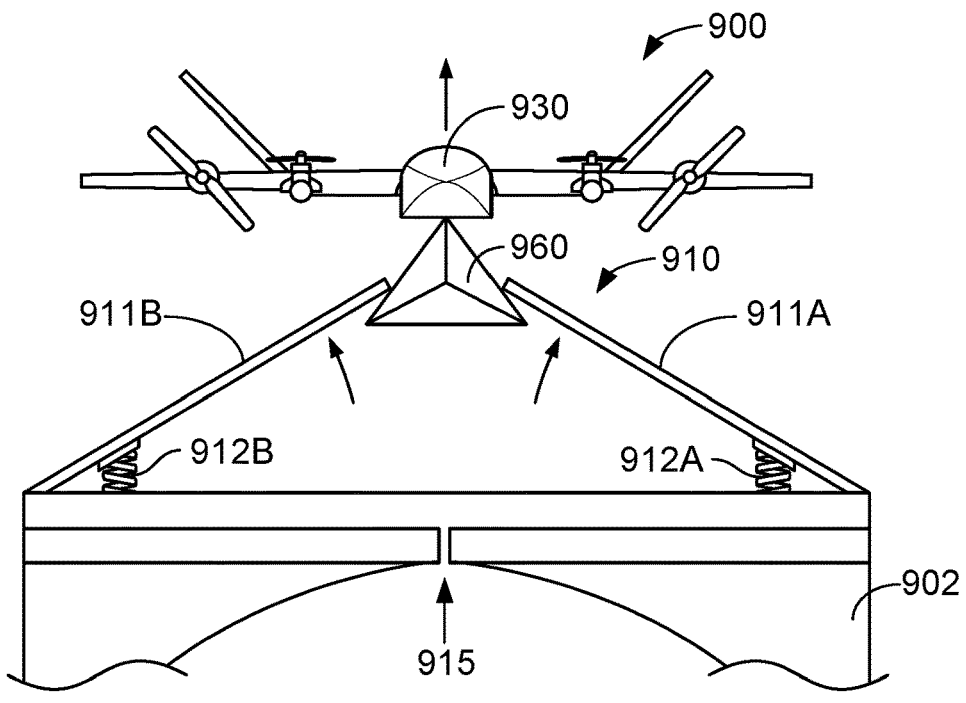
FIG. 9B depicts further aspects of a payload loading system, according to an example embodiment

Continuing, FIGS. 9A and 9B depict a payload loading system 900. The payload loading system 900 may be similar to the payload loading system 400 of FIGS. 4A-4C. Further, a loading structure 902, a UAV approach opening 907, a channel 915, a UAV 930, and a payload 960 may all be similar to components disclosed within the payload loading system 400. Further, a landing platform 910 may be similar in some aspects to the landing platform 410.

The landing platform 910 of FIGS. 9A and 9B further includes a first hinged door 911A, a first spring 912A, a second hinged door 911B, and a second spring 912B. The first hinged door 911A and the second hinged door 911B may open when the UAV 930 departs from the loading structure 902 with the payload 960. In some examples, the UAV 930 may fly forward with a tether extended such that the tether passes through the rest of the channel 915. Once in flight and clear of the loading structure 902, the UAV 930 may retract the tether using a winch system. However, as depicted in FIGS. 9A and 9B, in another embodiment, the UAV 930 may begin to hover above the landing platform 910 and retract the tether such that the tether pulls the payload 960 through the hinged doors 911A-911B.

In some examples, the springs 912A-912B may be coupled between each of the hinged doors 911A-911B, respectively. The springs 912A-912B may be in a compressed state when the hinged doors 911A-911B are down such that the hinged doors 911A-911B exert less force against the payload 960 as the payload 960 is pulled through than the hinged doors 911A-911B otherwise would. In some embodiments, the UAV 930 may hover until the payload 960 is retracted fully up to the UAV 930, while in other embodiments the UAV 930 may begin to fly forward as the tether is retracted and/or the payload 960 is still being pulled through the hinged doors 911A-911B. Other modes of take-off and departure from the loading structure are contemplated herein.

Figure 10:
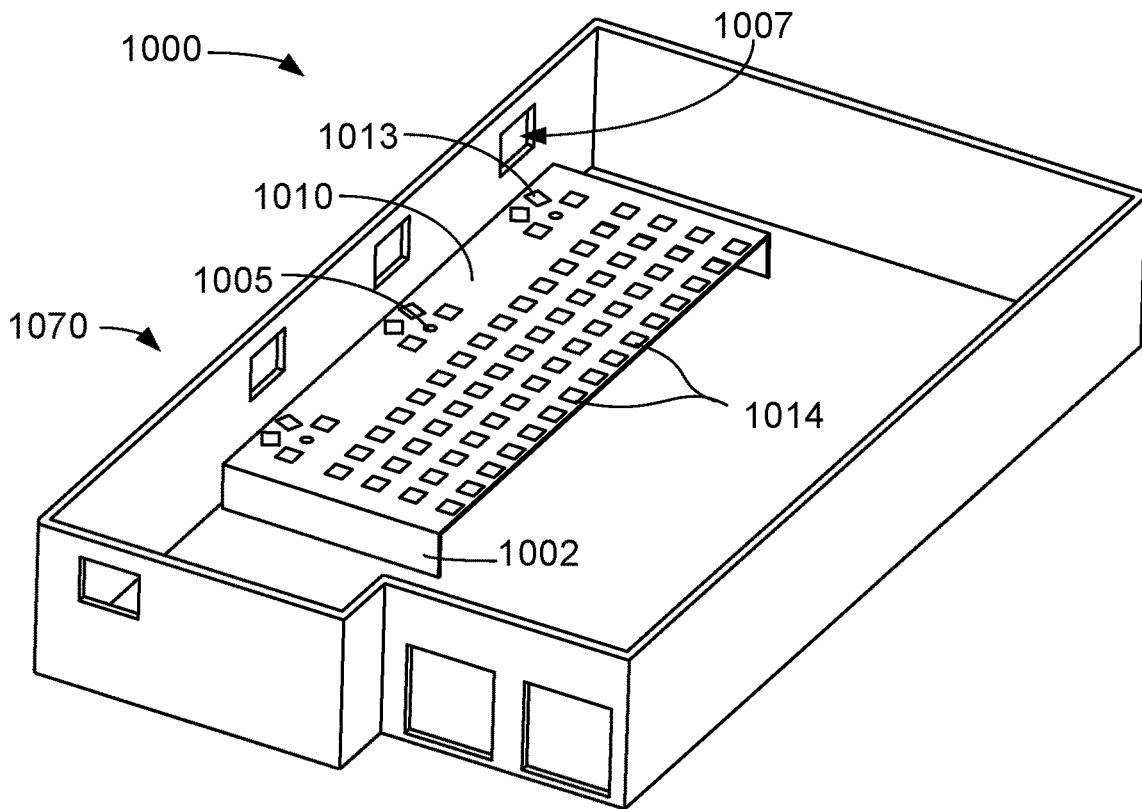
FIG. 10 depicts a payload loading system, according to an example embodiment.

FIG. 10 depicts a payload loading system 1000 within a warehouse 1070. The payload system 1000 may include components and function similarly to the other payload loading systems disclosed herein. Moreover, the payload loading system 1000 may be considered one example implementation of a payload loading system disclosed herein within a different merchant module (i.e., the warehouse 1070). The payload loading system 1000 includes a loading structure 1002 that further includes tether guides 1005, a landing platform 1010, and landing pads 1013. The warehouse 1070 may include one or more openings 1007 for UAVs to enter and exit the warehouse 1070 in order to deliver and pick up various payloads. In some examples, the warehouse 1070 may be a distribution center for a UAV delivery service. Moreover, the loading structure 1002 includes a plurality of docking stations 1014 for UAVs to charge, be maintained, and otherwise be prepared for use within a UAV delivery service.

Figure 11:
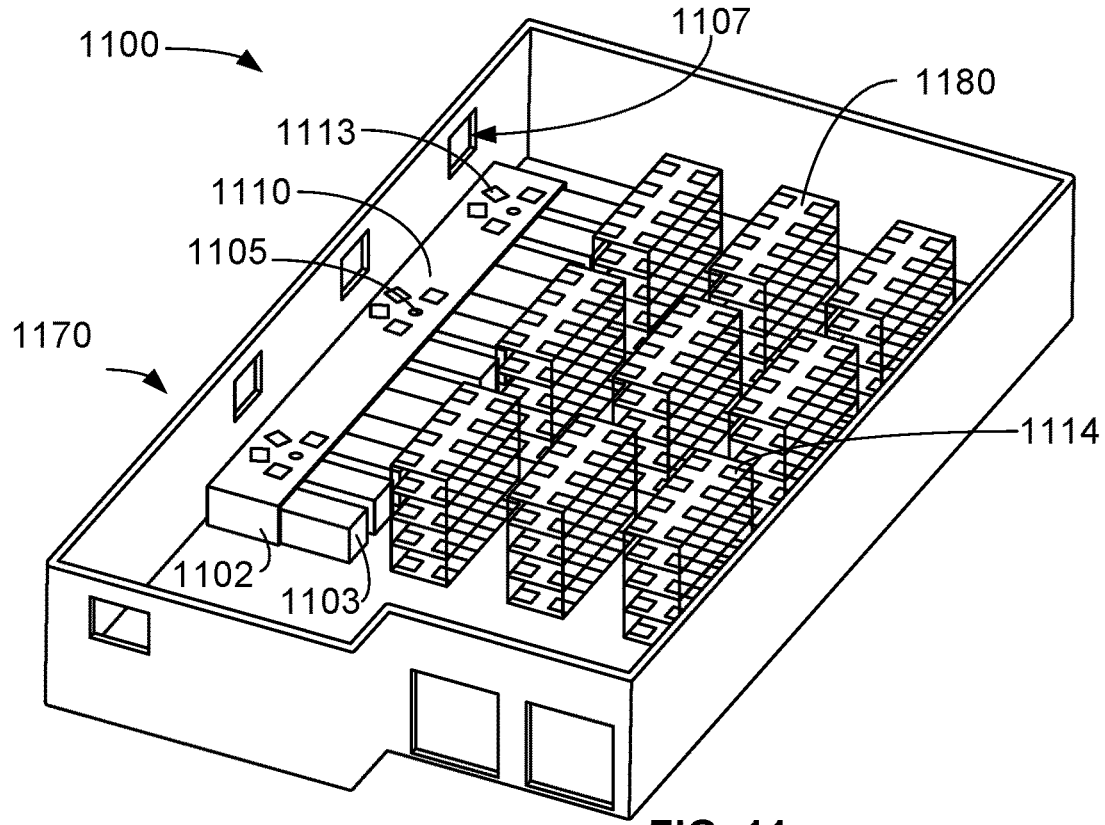
FIG. 11 depicts a payload loading system, according to an example embodiment.

FIG. 11 depicts a payload loading system 1100 within a warehouse 1170. The payload system 1000 may include components and function similarly to the other payload loading systems disclosed herein. The payload loading system 1100 includes a loading structure 1102 that is coupled to a plurality of modules 1103. Each of the modules 1103 may include one type of good to be distributed via a UAV delivery service, among other examples. UAVs may enter and exit the warehouse 1107 through one or more openings 1107. The loading structure 1102 further includes a plurality of tether guides 1105, a landing platform 1110, and a plurality of landing pads 1113. Further, the payload loading system 1100 includes a plurality of docking stations 1114 on UAV docking structures 1180 for UAVs to charge, be maintained, and otherwise be prepared for use within a UAV delivery service.

Figure 12:
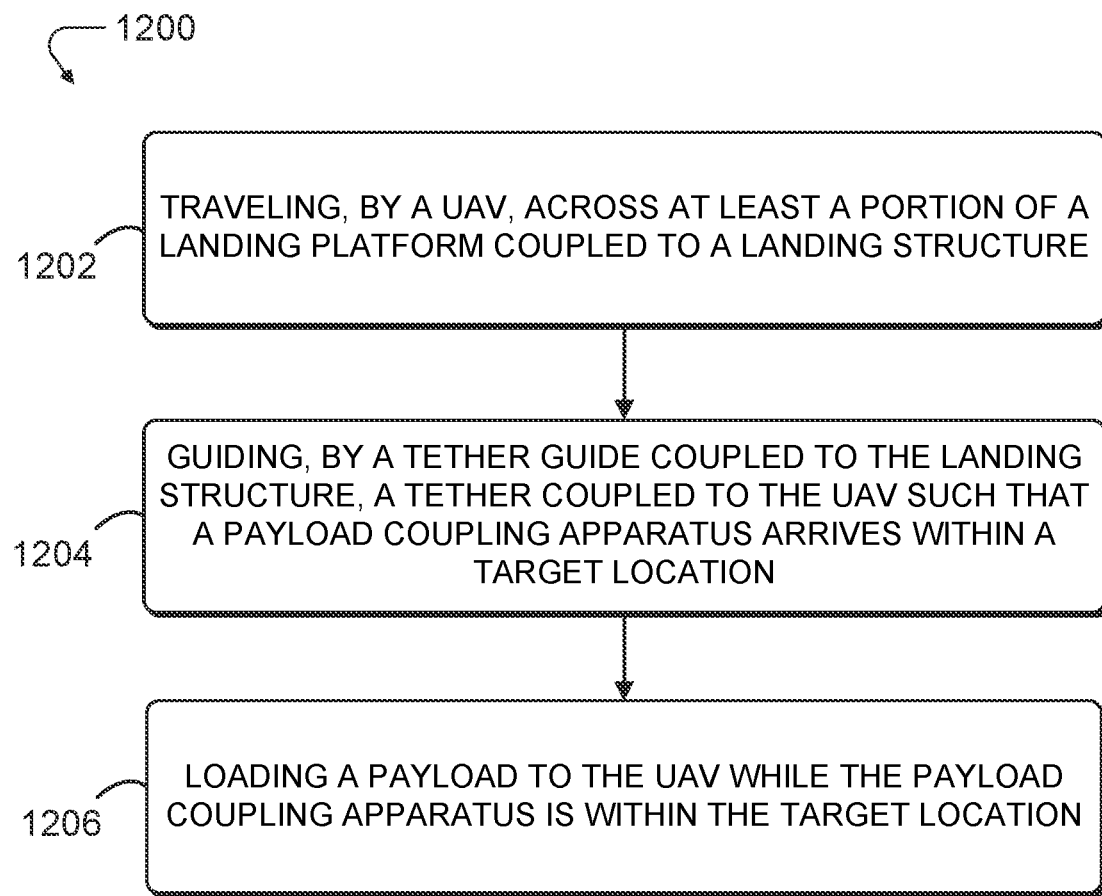
FIG. 12 is a simplified block diagram illustrating a method relating to a payload loading system, according to an example embodiment.

Additionally, a method for loading a payload to a UAV is disclosed. FIG. 12 is a simplified block diagram illustrating a method 1200 for loading a payload to a UAV, according to an example embodiment. It should be understood that example methods, such as method 1200, might be carried out by entities, or combinations of entities (i.e., by other computing devices, and/or combinations thereof), without departing from the scope of the invention.

For example, functions of the method 1200 may be fully performed by a machine, a human operator, a computing device (or components of a computing device such as one or more processors or controllers), or may be distributed across multiple components of the computing device, across multiple computing devices, and/or across a server. In some examples, the computing device may receive information from input commands initiated by an operator, sensors of the computing device, or may receive information from other computing devices that collect the information.

As shown by block 1202, the method 1200 includes a UAV traveling across at least a portion of a landing platform. Within examples, the landing platform may be coupled to a loading structure. The loading structure may be part of a payload loading system and may further be part of a UAV delivery service. The loading structure and landing platform may be coupled to existing structures, or in other examples the loading structure and landing platform may be installed as new structures. The loading structure and landing platform may be located at merchant modules, food trucks, warehouses, distributions centers, residences, within communities, among other locations.

As shown by block 1204, the method 1200 further includes guiding a tether such that a payload coupling apparatus arrives at a target location. The tether is guided by a tether guide that is couple to the loading structure. The payload coupling apparatus may be coupled to a tether, and the tether may be coupled to the UAV. The tether may be extended from the UAV as the tether is guided by the tether guide.

As shown by block 1206, the method 1200 further includes loading a payload. The payload is loaded to the UAV by coupling the payload to the payload coupling apparatus while the payload and payload coupling apparatus are within the target location.

The method 1200 may further include additional aspects. For example, the method 1200 may include locating at least a portion of the tether within an opening of the loading structure as the UAV approaches the loading structure. In another example, the method 1200 may include locating the payload coupling apparatus within an opening of the loading structure as the UAV approaches the loading structure. Locating the tether and/or the payload coupling apparatus as the UAV approaches may be carried out by the UAV in flight. Locating the tether and/or the payload coupling apparatus may be completed by the UAV as a check of the UAV's alignment and orientation relative to the landing platform. Further, locating the tether and/or payload coupling apparatus may act as a check that the tether is aligned such that the tether will be funneled and guided by the tether guide. Moreover, the method 1200 may include maintaining an alignment of the tether by the UAV and tether guide as the payload is loaded to the UAV.

The method 1200 may further include charging a battery of the UAV when the UAV lands on the landing platform. In other examples, the UAV may charge when the UAV comes into contact with a landing pad within the landing platform. Within yet other embodiments, the method 1200 may include unloading a first payload from the payload coupling apparatus before loading a second payload. The method 12 may also include extending the tether a length by the UAV such that the payload coupling apparatus is below the tether guide as the UAV approaches and/or travels across the landing platform.

In other embodiments the method 1200 may include more or less blocks as well as blocks that carry out various functions described herein. Also, while the blocks are expressed in a specific order herein, other ordering of the various blocks is considered herein.

VI. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A method comprising:
   unwinding a spool of an unmanned aerial vehicle (UAV) to extend a tether of the UAV as the UAV approaches a landing structure;
   guiding, by a tether guide coupled to the landing structure, the extended tether such that a payload coupling apparatus coupled to a distal end of the tether reaches a target location; and
   winding the spool of the UAV to retract the tether after the UAV has departed from the landing structure,
   wherein the tether guide comprises at least one of:
     an edge of a landing platform coupled to the landing structure, or
     a partition coupled to a bottom-side of a landing platform of the landing structure.

2. The method of claim 1, wherein guiding the extended tether comprises causing the payload coupling apparatus to pass through an opening of the landing structure.

3. The method of claim 1, wherein the spool of the UAV is unwound such that the tether extends a length such that the payload coupling apparatus is below the tether guide as the UAV approaches the landing structure.

4. The method of claim 1, wherein the tether guide is conical.

5. The method of claim 1, further comprising:
   coupling a payload to the payload coupling apparatus when the payload coupling apparatus is at the target location.

6. A method comprising:
   unwinding a spool of an unmanned aerial vehicle (UAV) to extend a tether of the UAV as the UAV approaches a landing structure;
   traveling in a first directional heading, by the UAV, across at least a portion of the landing structure;
   guiding, by a tether guide coupled to the landing structure, the extended tether in a second directional heading such that a payload coupling apparatus coupled to a distal end of the tether reaches a target location; and
   winding the spool of the UAV to retract the tether after the UAV has departed from the landing structure.

7. The method of claim 6, wherein the first directional heading is different than the second directional heading.

8. A system comprising:
   an unmanned aerial vehicle (UAV) that comprises a tether, wherein a distal end of the tether is coupled to a payload coupling apparatus; and
   a structure comprising:
     a landing platform for the UAV;
     a tether guide coupled to the landing platform, wherein the tether guide directs the tether of the UAV such that the payload coupling apparatus arrives at a target location; and
     an opening, wherein the tether guide directs the payload coupling apparatus through the opening of the structure.

9. The system of claim 8, wherein the UAV extends the tether before arriving at the structure.

10. The system of claim 8, wherein the UAV does not retract the tether until departing from the structure.

11. The system of claim 8, wherein the tether guide comprises an edge of the landing platform.

12. The system of claim 8, wherein the tether guide comprises a stanchion coupled to a bottom-side of the landing platform.

13. A structure, comprising:
- a platform for an unmanned aerial vehicle (UAV), where the UAV comprises a tether and a payload coupling apparatus, wherein the payload coupling apparatus is coupled to a distal end of the tether;
- an opening wherein the payload coupling apparatus passes through the opening of the structure during at least one of a departure or landing operation; and
- a tether guide coupled to the platform, wherein the tether guide directs the tether such that the payload coupling apparatus passes through the opening of the structure.

14. The structure of claim 13, wherein the tether guide is coupled to a bottom-side of the platform such that the tether guide is at a lower elevation than the platform.

15. The structure of claim 13, wherein the tether guide is conical and defines the opening of the structure, and wherein during the departure or landing operation the payload coupling apparatus pass through the opening of the structure.

16. The structure of claim 13, wherein the tether guide comprises a plurality of edges of the platform.

17. The structure of claim 13, wherein the tether guide directs the tether after the tether has been extended from the UAV.

18. The structure of claim 13, wherein the tether guide defines a plurality of tether paths, wherein the tether follows one of the tether paths as the UAV travels across the landing platform, wherein each of the plurality of tether paths direct the tether such that the payload coupling apparatus arrives at the target location.

* * * * *